US012752447B2

(12) United States Patent
Takano et al.

(10) Patent No.: US 12,752,447 B2
(45) Date of Patent: Oct. 6, 2026

(54) HAIR CLIPPER AND MOTOR BLOCK USED IN HAIR CLIPPER

(71) Applicant: Panasonic Intellectual Property Management Co., Ltd., Osaka (JP)

(72) Inventors: Daisuke Takano, Shiga (JP); Hitoshi Ogawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 18/652,838

(22) Filed: May 2, 2024

(65) Prior Publication Data

US 2024/0416539 A1 Dec. 19, 2024

(30) Foreign Application Priority Data

Jun. 16, 2023 (JP) ................................ 2023-099254

(51) Int. Cl.
*B26B 19/06* (2006.01)
*B26B 19/28* (2006.01)

(52) U.S. Cl.
CPC .............. *B26B 19/06* (2013.01); *B26B 19/28* (2013.01)

(58) Field of Classification Search
CPC ......... B26B 19/06; B26B 19/28; F16C 17/00; F16C 17/026
See application file for complete search history.

(56) References Cited

U.S. PATENT DOCUMENTS 3,086,133 A 4/1963 Tolmie
5,367,772 A 11/1994 Ogawa
2014/0259691 A1 * 9/2014 Arndt ...................... B26B 19/06 30/277.4

FOREIGN PATENT DOCUMENTS

JP 5-317537 12/1993

OTHER PUBLICATIONS

The EPC Office Action dated Oct. 23, 2024 for the related European Patent Application No. 24176634.4.

* cited by examiner

*Primary Examiner* — Liang Dong
(74) *Attorney, Agent, or Firm* — Rimon P.C.

(57) ABSTRACT

The present disclosure provides a hair clipper capable of reducing noise during use, and a motor block used in the hair clipper. The hair clipper according to the present disclosure includes rotary motor including motor drive unit and rotary shaft extending in a first direction, and motor drive unit includes bearing that supports rotary shaft in a state where clearance is provided between the bearing and peripheral surface of rotary shaft. The hair clipper also includes: shaft stopper that presses rotary shaft in at least one direction in directions intersecting the first direction to restrict shaft shaking during rotation of rotary shaft caused by clearance while allowing rotation of rotary shaft; and support part that supports shaft stopper.

14 Claims, 11 Drawing Sheets

HAIR CLIPPER AND MOTOR BLOCK USED IN HAIR CLIPPER

BACKGROUND

1. Technical Field

The present disclosure relates to a hair clipper and a motor block used in a hair clipper.

2. Description of the Related Art

As disclosed in PTL 1, a hair clipper including a movable blade capable of reciprocating linear motion and a fixed blade with which the movable blade is capable of sliding contact has been conventionally known.

PTL 1 shows that a rotary motor is used as a drive source that linearly reciprocates the movable blade, and an output shaft of the rotary motor is connected to the movable blade using a conversion mechanism. This configuration allows the movable blade to reciprocate linearly with rotation of the output shaft.

CITATION LIST

Patent Literature

PTL 1: Unexamined Japanese Patent Publication No. H05-317537

SUMMARY

As described above, a hair clipper of a type in which a movable blade is linearly reciprocated using a rotary motor is preferably reduced in noise during use.

Thus, an object of the present disclosure is to obtain a hair clipper capable of reducing noise during use and a motor block used in the hair clipper.

A hair clipper according to an aspect of the present disclosure includes: a rotary motor that includes a rotary shaft extending in a first direction and a motor drive unit capable of rotationally driving the rotary shaft; a conversion mechanism that is connected to the rotary shaft and is capable of converting rotational motion of the rotary shaft into reciprocating linear motion; a movable blade that is connected to the conversion mechanism and is capable of reciprocating linear motion; a fixed blade with which the movable blade is allowed to be in sliding contact; a bearing that is provided in the motor drive unit to support the rotary shaft in a state where clearance is provided between the bearing and a peripheral surface of the rotary shaft; a shaft stopper that presses the rotary shaft in at least one direction in directions intersecting the first direction to restrict shaft shaking during rotation of the rotary shaft caused by the clearance while allowing rotation of the rotary shaft; and a support part that supports the shaft stopper.

A motor block according to an aspect of the present disclosure is used in the hair clipper.

The present disclosure provides a hair clipper capable of reducing noise during use and a motor block used in the hair clipper.

DETAILED DESCRIPTIONS

Hereinafter, an exemplary embodiment will be described in detail with reference to the drawings. However, detailed description more than necessary may not be described. For example, a detailed description of already well-known matters or a duplicated description of a substantially identical configuration may not be described.

The accompanying drawings and the following description are only presented to help those skilled in the art fully understand the present disclosure and are not intended to limit the subject matters described in the scope of claims.

In the following exemplary embodiment and its modifications, a Z-direction is defined as a direction in which a rotary shaft of a rotary motor extends (that is, an axial direction of the rotary shaft), a Y-direction is defined as a direction in which a movable blade reciprocates linearly, and an X-direction is defined as a direction intersecting (e.g., orthogonal to) the Y-direction and the Z-direction. The Z-direction herein may be also referred to as a first direction or a vertical direction. The Y-direction herein may be also referred to as a width direction or a second direction. The X-direction herein may be also referred to as a front-back direction or a third direction.

A hair clipper is described with a vertical direction defined when the rotary shaft has a distal end facing upward.

In the following exemplary embodiment and its modifications, a side on which a switch button is provided is defined as a front side (that is, forward in the X-direction) of the hair clipper.

Exemplary Embodiment

Figure 1:
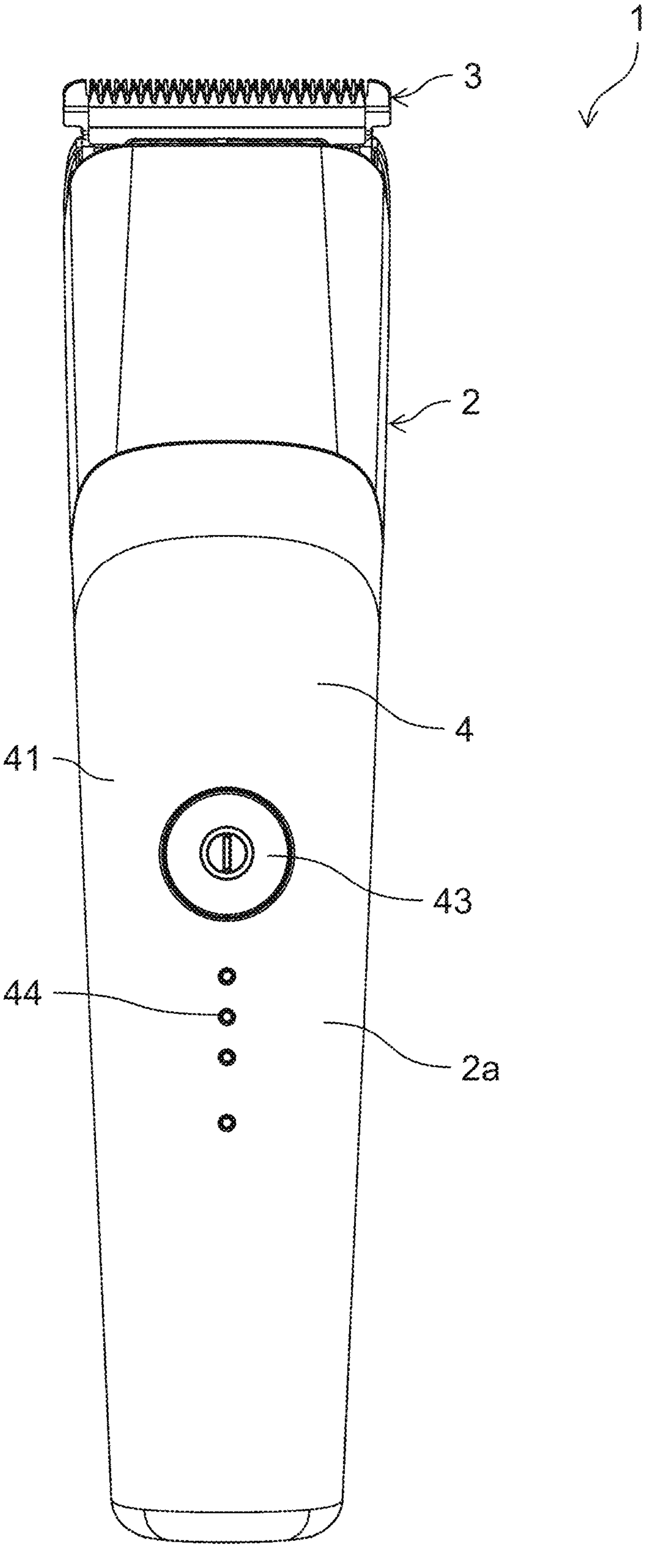
FIG. 1 is a front view illustrating an example of a hair clipper according to an exemplary embodiment.
Figure 2:
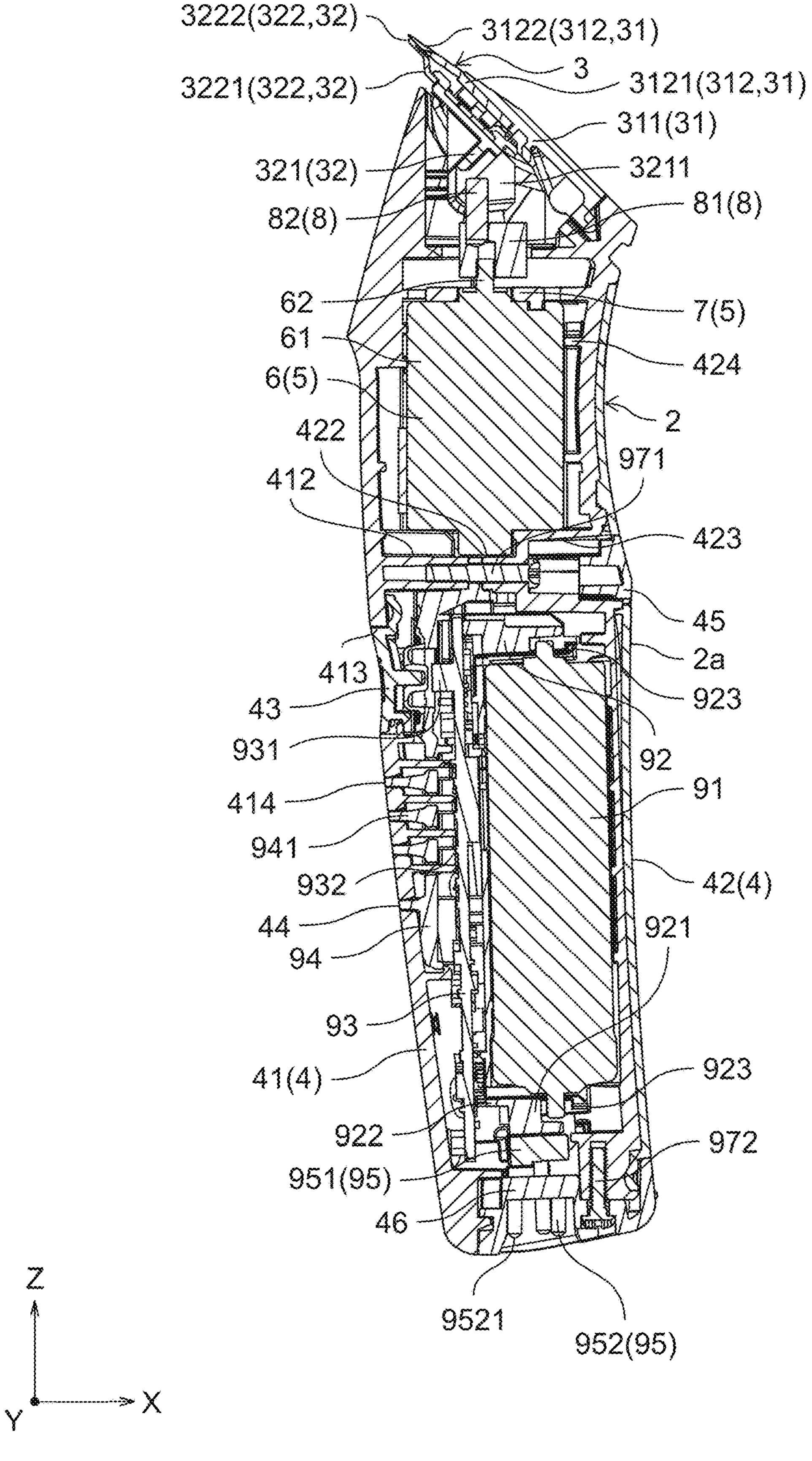
FIG. 2 is a sectional view illustrating an example of the hair clipper according to the exemplary embodiment.
Figure 3:
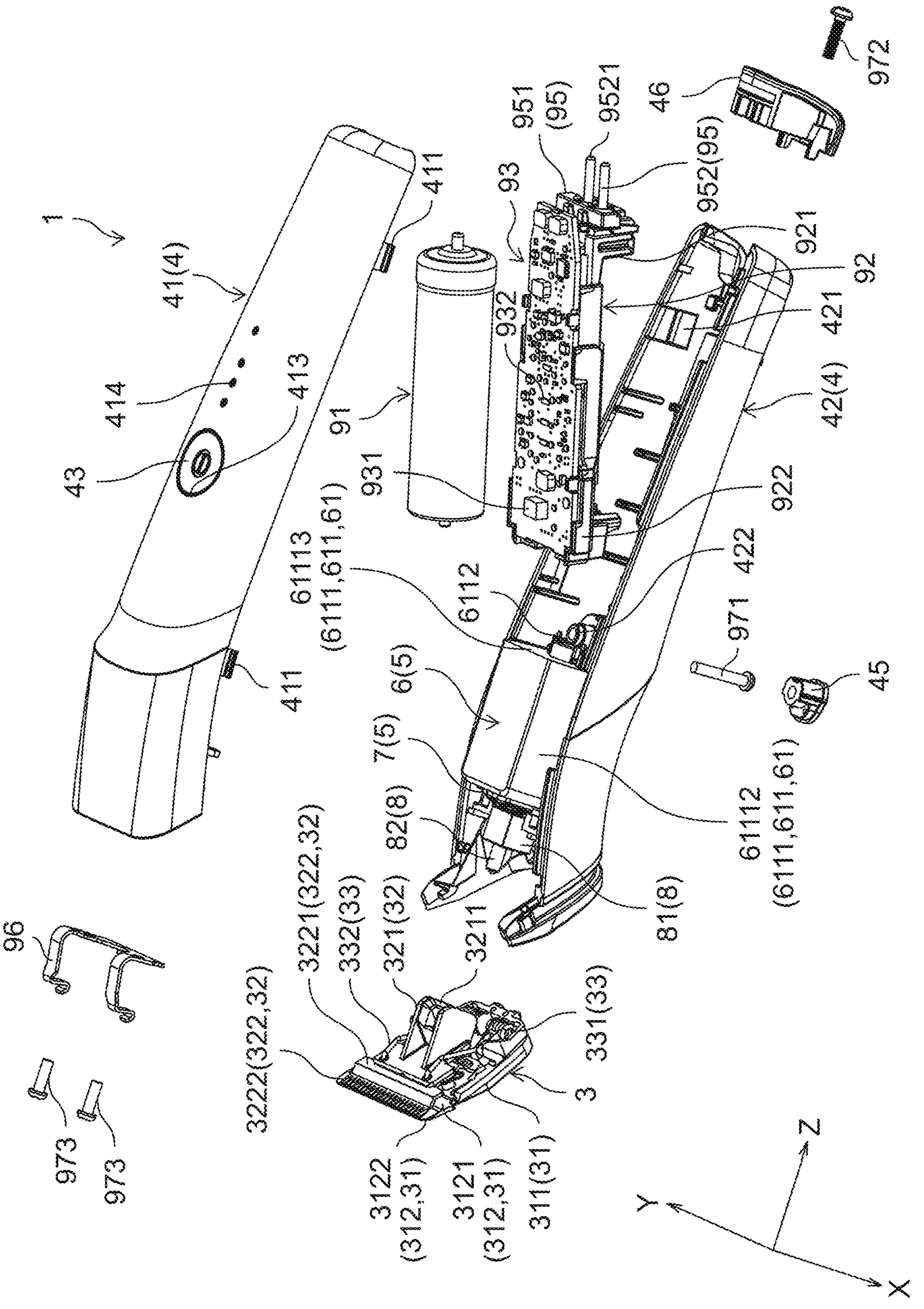
FIG. 3 is an exploded perspective view illustrating an example of the hair clipper according to the exemplary embodiment.

FIG. 1 is a front view illustrating an example of hair clipper 1 according to an exemplary embodiment. FIG. 2 is a sectional view illustrating an example of hair clipper 1 according to the exemplary embodiment. FIG. 3 is an exploded perspective view illustrating an example of hair clipper 1 according to the exemplary embodiment. As illustrated in FIGS. 1 to 3, hair clipper 1 according to the present exemplary embodiment includes body 2 and blade block 3 detachably attached to body 2. In the present exemplary embodiment, body 2 has an elongated shape, and is provided with holder 2*a* that can be held by hand.

Hair clipper 1 is for a device treating or arranging hair of a user or the like by cutting the hair of the user or the like to a desired length, for example. Blade block 3 includes fixed blades 3122 made of metal, and movable blades 3222 made of metal and caused to reciprocate in a sliding manner (that is, in sliding contact with) along fixed blades 3122 in the Y-direction (that is, in the width direction or the second direction).

Blade block 3 is mounted on body 2, and then, movable blades 3222 is reciprocated in a sliding manner in the Y-direction (that is, the width direction or the second direction) along fixed blades 3122 using rotary motor 6 accommodated in body 2 as a drive source. In this way, hair is inserted into a gap between fixed blades 3122 and movable blades 3222 to be cut.

In the present exemplary embodiment, body 2 also includes housing 4 that forms an outer shell of hair clipper 1. This housing 4 may be made of a material such as a synthetic resin, for example, and is provided with switch button 43 that is attached to be allowed to be pushed inward in a state of being exposed to the outside.

In the present exemplary embodiment, housing 4 is formed by joining a plurality of split bodies, and includes first split housing 41 in which switch button 43 and display 44 are formed, and second split housing 42 joined to first split housing 41. Housing 4 formed by joining the plurality of split bodies including first split housing 41 and second split housing 42 is provided inside with a cavity in which various electric components such as rotary motor 6 are accommodated. The plurality of split bodies may be joined together by using a screw or fitting the split bodies to each other, for example.

As illustrated in an example of FIG. 3, in the present exemplary embodiment, when first split housing 41 and second split housing 42 are joined together, hook part 411 formed in first split housing 41 is locked to locking part 421 formed in second split housing 42. First split housing 41 and second split housing 42 are joined to each other by fixing annular rib 412 formed in first split housing 41 and annular rib 422 formed in second split housing 42 with screw 971 in a state where annular rib 412 and annular rib 422 face each other.

As illustrated in FIG. 2, in the present exemplary embodiment, recess 423 recessed forward (that is, toward first split housing 41) is formed in second split housing 42, and recess 423 is provided at its front end with annular rib 422. Recess 423 accommodates a head of screw 971 when annular rib 412 and annular rib 422 are fixed by screw 971, and is closed by screw concealing cover 45 in a state where the head of screw 971 is accommodated in recess 423. This configuration prevents screw 971 for fixing annular rib 412 and annular rib 422 from being exposed to the outside.

In the present exemplary embodiment, battery 91 and rotary motor 6 driven by battery 91 are accommodated in the cavity inside housing 4 formed as described above. Rotary motor 6 is accommodated in the cavity inside housing 4 in a state of being held by motor holder 424 formed in second split housing 42.

On the other hand, battery 91 is accommodated in the cavity inside housing 4 in a state of being held by battery holder 921 formed in battery holding base 92. In the present exemplary embodiment, battery holder 921 is formed so as to be open backward in the X-direction (that is, the front-back direction and the third direction), and battery 91 is held by battery holder 921 by accommodating battery 91 in battery holder 921. Battery holding base 92 is accommodated in the cavity inside housing 4 in a state where battery 91 is accommodated in battery holder 921. In this way, battery 91 is accommodated in the cavity inside housing 4.

Examples of battery 91 accommodated in battery holder 921 include a dry battery, and a rechargeable battery (that is, a rechargeable battery in the shape of a dry battery) identical in shape to the dry battery and being compatible with the dry battery. The present exemplary embodiment shows an example using only one rechargeable battery identical in shape to a dry battery and being compatible with the dry battery (that is, a rechargeable battery in the shape of a dry battery). As illustrated in FIG. 3, housing 4 has a width (that is, a length in the Y-direction) set to the extent that two rechargeable batteries (that is, an example of a rechargeable battery in the shape of a dry battery) are not allowed to be provided side by side in the Y-direction. As described above, the present exemplary embodiment exemplifies hair clipper 1 that are further downsized. Hair clipper 1, which is small in size as described above, can be used as a hair clipper for finishing hairlines such as a sideburn and a neck line, for example.

Further, the cavity formed inside housing 4 accommodates eccentric cam 8 (that is, an example of a conversion mechanism) as a conversion mechanism that converts rotational motion of rotary shaft 62 provided in rotary motor 6 into reciprocating linear motion.

Eccentric cam 8 includes cam body 81 connected to a distal end part (that is, an upper end part) of rotary shaft 62, and eccentric shaft 82 connected at a position eccentric to rotary shaft 62 at an upper part of cam body 81. When rotary shaft 62 is rotated, cam body 81 rotates in conjunction with rotation of rotary shaft 62, and eccentric shaft 82 rotates about rotary shaft 62 in conjunction with rotation of cam body 81.

In the present exemplary embodiment, as illustrated in FIG. 2, eccentric shaft 82 is accommodated in the cavity inside housing 4 in a state where the distal end thereof protrudes toward blade block 3 (upward in FIG. 2), and eccentric shaft 82 has a distal end part connected to guide plate 321, which will be described later, of blade block 3.

The cavity formed inside housing 4 also accommodates circuit board 93 that controls power supply to rotary motor 6 in response to pressing operation of switch button 43 exposed to the outside. This circuit board 93 is accommodated in the cavity inside housing 4 in a state of being held by board holder 922 formed in front of battery holding base 92 in the X-direction (that is, the front-back direction and the third direction).

In addition, a pair of electrode terminals 923 are attached to battery holder 921. When battery 91 is disposed in battery holder 921 formed in battery holding base 92, one electrode of battery 91 is electrically connected to circuit board 93 via one of electrode terminals 923, and another electrode of battery 91 is electrically connected to circuit board 93 via the other of electrode terminals 923.

Rotary motor 6 is provided with a pair of terminals 6112, and each terminal 6112 is electrically connected to circuit board 93 using a lead wire (not illustrated). This configuration allows driving of rotary motor 6 to be controlled using electric power supplied from battery 91.

In the present exemplary embodiment, through-hole 413 is formed at a central part of first split housing 41 in the Y-direction (that is, the width direction and the second direction) at a central part thereof in the X-direction (that is, the front-back direction and the third direction), and is closed by switch button 43 (that is, an example of an operator). Switch button 43 is attached to first split housing 41 in a state of being movable in a penetration direction (that is, a plate thickness direction of first split housing 41) of through-hole 413. Pressing switch button 43 enables switching between on and off of a power supply of hair clipper 1.

Specifically, circuit board 93 is equipped with switch element 931. Switch element 931 is operated by using switch button 43 to switch on and off of the power supply.

Although switch button 43 of a press type is exemplified as an operator for switching on and off of the power supply in the present embodiment, other operators may be used. Available examples of the other operators include an operator of a slide type of a mechanical switch, and an operator of a switch other than the mechanical switch, such as an electrostatic sensor and a pressure sensitive sensor.

Circuit board 93 is also equipped with a plurality of LEDs 932, and four through-holes 414 are formed in a central part of first split housing 41 below through-hole 413 in the Y-direction (that is, the width direction and the second direction) in a state of being arranged substantially along the Z-direction (that is, the vertical direction and the first direction). Light emitted from LED 932 is emitted to the outside through through-holes 414.

In the present exemplary embodiment, the plurality of LEDs 932 mounted on circuit board 93 is covered with LED cover 94 with light permeability. In a state where the plurality of LEDs 932 is covered with LED cover 94, four light guiders 941 formed in LED cover 94 are inserted into corresponding through-holes 414. This configuration allows the light emitted from LED 932 to pass through light guider 941 and irradiate the outside, and thus enabling visual notification of hair clipper 1 in an energized state, battery 91 being charged, and the like using color of the irradiated light and a light irradiation method (e.g., constant lighting, blinking, and the like), for example. As described above, in the present exemplary embodiment, through-holes 414 closed by respective light guiders 941 have a function as display 44 for checking on and off states of the power supply, a charging status of battery 91, and the like.

As illustrated in FIG. 2, battery holding base 92 holds plug unit 95 in the present exemplary embodiment. Plug unit 95 is formed by holding plug terminal 952 on plug base 951, and plug terminal 952 is electrically connected to circuit board 93 in a state where plug base 951 holding plug terminal 952 is held on battery holding base 92.

This plug unit 95 is held at a lower end of battery holding base 92 in the Z-direction (that is, the vertical direction and the first direction) in a state where plug terminal 952 has distal end part 9521 facing downward. Distal end part 9521 of plug terminal 952 is exposed to the outside of housing 4. Specifically, plug terminal 952 is inserted into an insertion hole (not illustrated) formed in plug cover 46, and plug cover 46 is fixed to second split housing 42 with screw 972 in a state where distal end part 9521 of plug terminal 952 is exposed from plug cover 46. In this way, the distal end part 9521 of plug terminal 952 is exposed to the outside of housing 4.

A charging cable (e.g., a charging code), which is not illustrated, is inserted into distal end part 9521 of plug terminal 952 exposed to the outside of housing 4 to charge battery 91.

Power may be also supplied from the outside using a power supply cord or the like.

Blade block 3 has a function of cutting hair, and includes a blade part (that is, blades of hair clipper) formed by disposing movable blades 3222 and fixed blades 3122 to face each other.

As illustrated in FIGS. 2 and 3, in the present exemplary embodiment, blade block 3 includes fixed blade block 31 having fixed blades 3122, and movable blade block 32 having movable blades 3222 and capable of reciprocating linear motion in the Y-direction (that is, the width direction or the second direction) relative to fixed blade block 31. Movable blade block 32 is caused to perform reciprocating linear motion in the Y-direction (that is, the width direction or the second direction) relative to fixed blade block 31. In this way, movable blades 3222 reciprocate in a sliding manner in the Y-direction (that is, the width direction or the second direction) along fixed blades 3122.

As illustrated in FIGS. 2 and 3, fixed blade block 31 includes fixed base 311 that is made of resin, and fixed plate 312 that is made of metal and that is fixed to fixed base 311. Fixed plate 312 includes body 3121 fixed to fixed plate 311 and fixed blades 3122 provided at a distal end of body 3121. Fixing fixed base 311 in a state where body 3121 of fixed plate 312 is fixed is fixed to body 2. In this way, fixed blade block 31 is mounted on body 2. At this time, fixed blade block 31 is fixed to body 2 in a state where at least a part close to a distal end of fixed blades 3122 protrudes from a distal end of body 2.

On the other hand, as illustrated in FIGS. 2 and 3, movable blade block 32 includes guide plate 321 made of resin and movable plate 322 made of metal and fixed to guide plate 321. Movable plate 322 includes body 3221 fixed to guide plate 321 and movable blades 3222 formed at a distal end of body 3221.

In a state where blade block 3 is attached to body 2, guide plate 321 is connected to rotary shaft 62 of rotary motor 6 using eccentric cam 8 (that is, an example of the conversion mechanism). Guide plate 321 is connected to eccentric shaft 82 by engaging a distal end part of eccentric shaft 82 with engagement recess 3211 formed in guide plate 321 in the present exemplary embodiment.

Further, in the present exemplary embodiment, movable blades 3222 are brought into contact with fixed blades 3122 in a state where blade block 3 is attached to body 2.

In this way, when rotary motor 6 is driven to rotate rotary shaft 62, guide plate 321 and movable plate 322 which is fixed to guide plate 321 (namely, movable blade block 32) perform reciprocating linear motion in the Y-direction (that is, the width direction and the second direction) in conjunction with movement of eccentric shaft 82. Movable blade block 32 is caused to perform reciprocating linear motion in the Y-direction (that is, the width direction or the second direction). In this way, movable blades 3222 is caused to reciprocate in a sliding manner in the Y-direction (that is, the width direction or the second direction) along fixed blades 3122, thereby hair is cutted by movable blades 3222 and fixed blades 3122. A method for driving blade block 3 is not limited to the above-described method, and various methods are available.

In the present exemplary embodiment, blade block 3 includes push-up spring 33 that is made of metal and that presses movable plate 322 toward fixed plate 312.

Push-up spring 33 is a member for pressing movable plate 322 toward fixed plate 312 to bring movable blades 3222 and the fixed blades 3122 into sliding contact with each other more reliably, and may be formed of a torsion spring, for example. In the present exemplary embodiment, push-up spring 33 includes coil part 331, and arm part 332 that is connected to an end of coil part 331 and that is fixed to movable plate 322 to press movable plate 322 toward fixed plate 312.

Further, in the present exemplary embodiment, blade stop spring 96 is fixed to housing 4 with screw 973, and blade stop spring 96 holds blade block 3 to prevent blade block 3 from coming off from housing 4.

Figure 4:
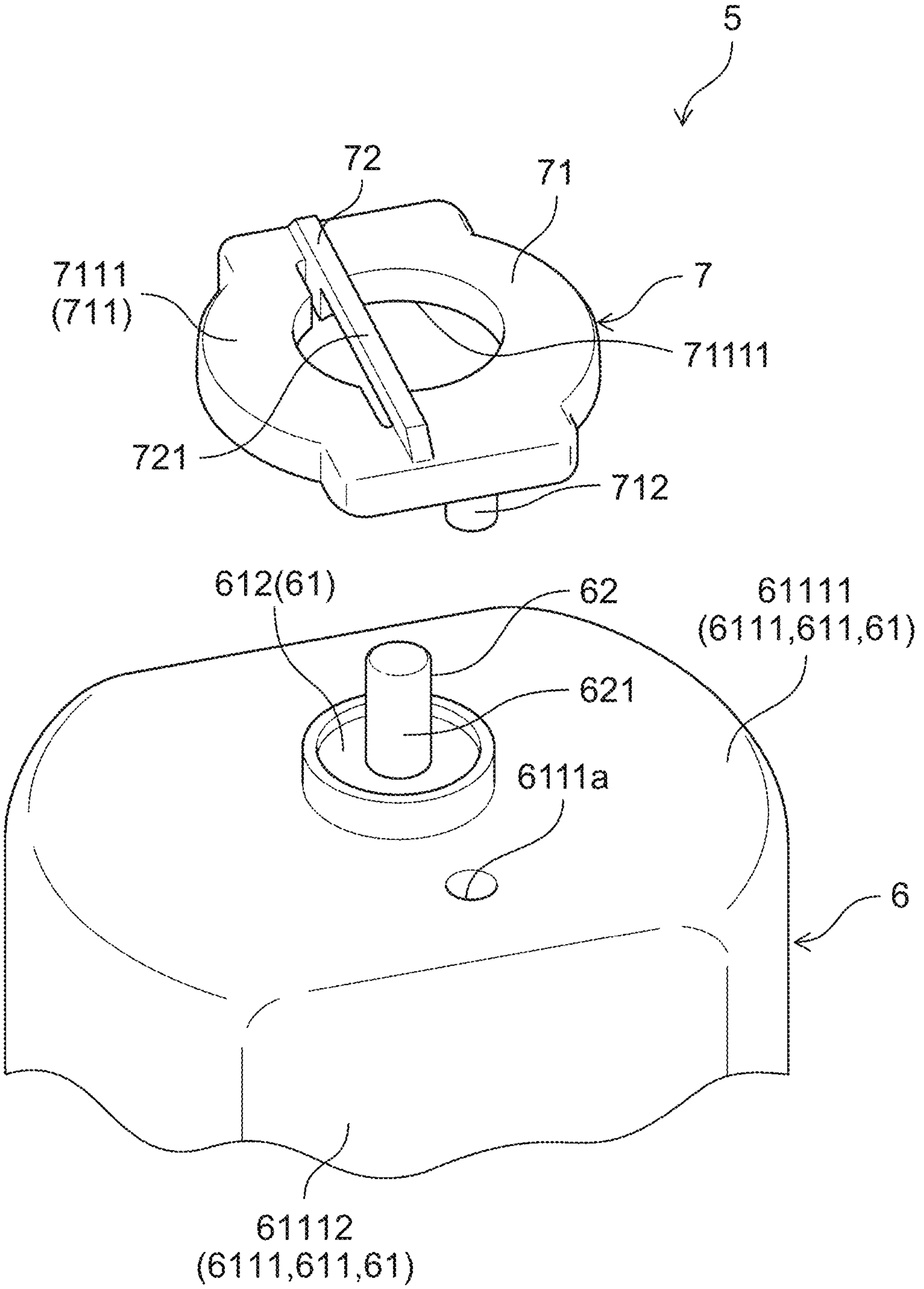
FIG. 4 is an enlarged perspective view illustrating an example of a motor block according to the exemplary embodiment in a state before a motor block member and a rotary motor are integrated.
Figure 5:
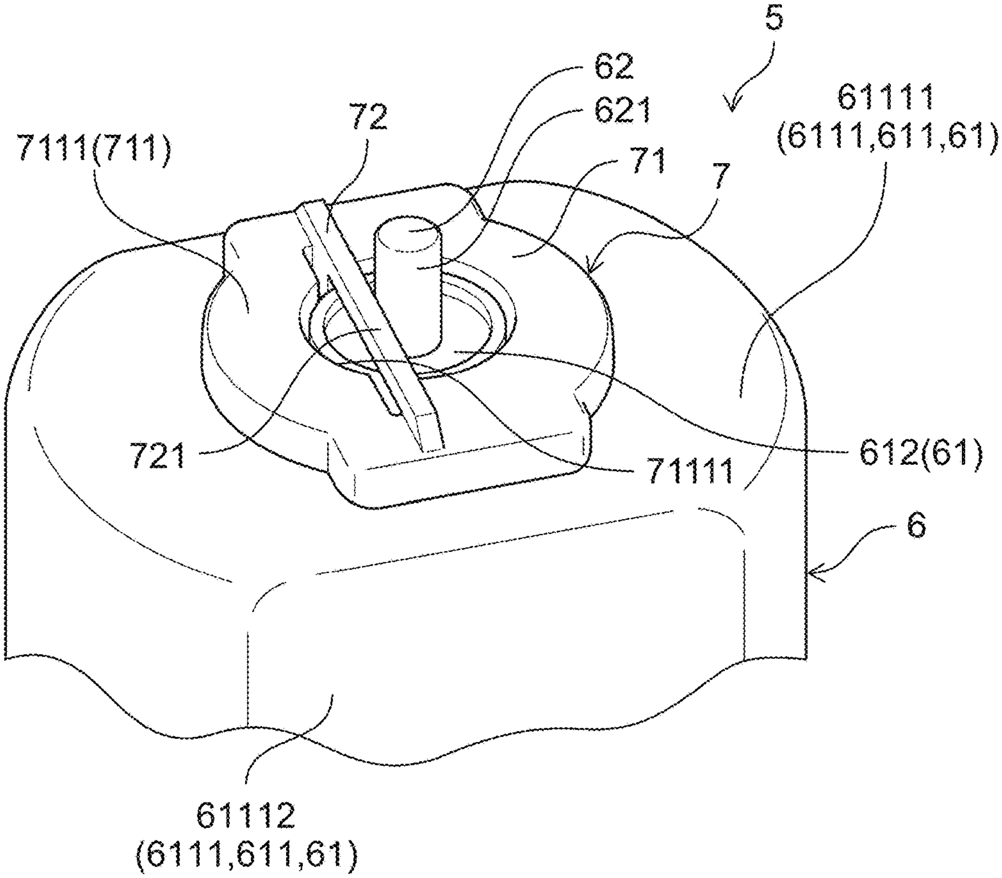
FIG. 5 is an enlarged perspective view illustrating an example of the motor block according to the exemplary embodiment in a state where the motor block member and the rotary motor are integrated.
Figure 6:
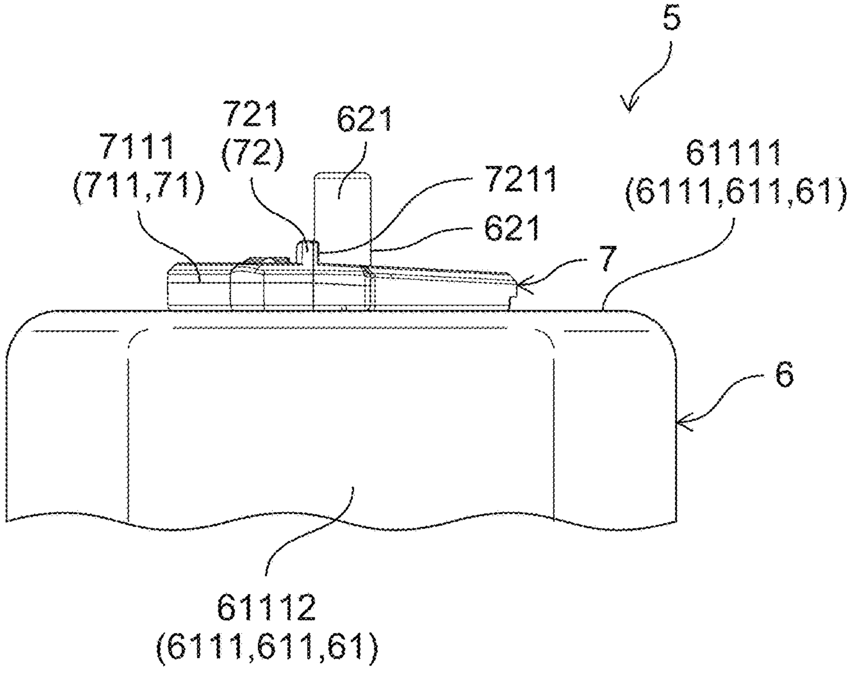
FIG. 6 is an enlarged front view illustrating an example of the motor block according to the exemplary embodiment in the state where the motor block member and the rotary motor are integrated.
Figure 7:
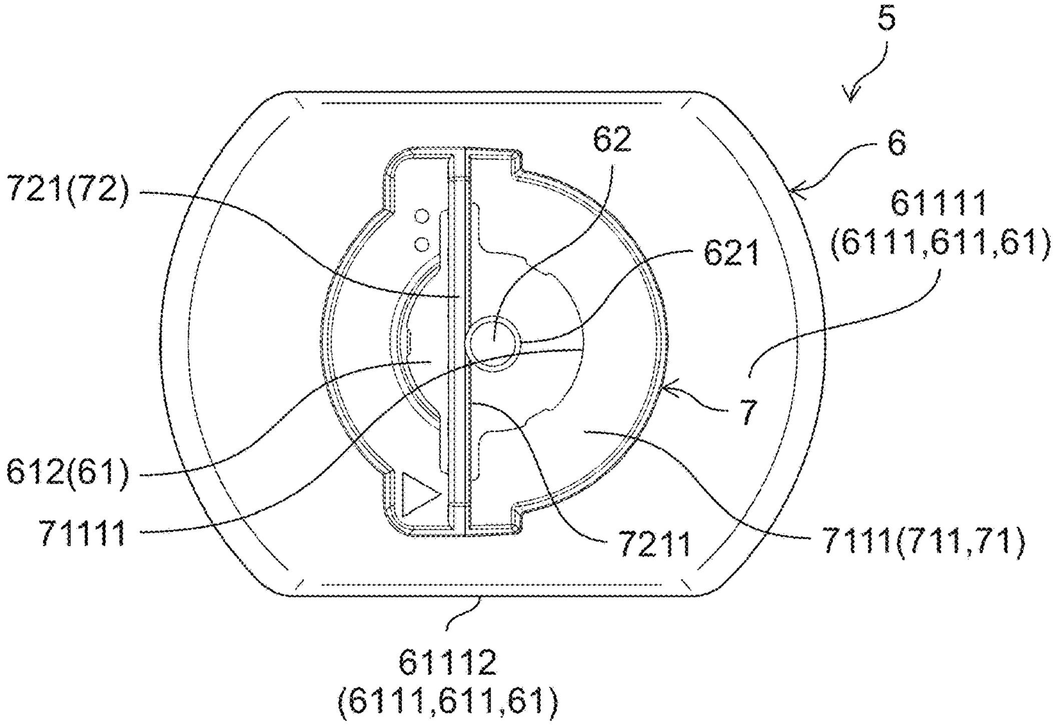
FIG. 7 is a plan view illustrating an example of the motor block according to the exemplary embodiment in the state where the motor block member and the rotary motor are integrated.
Figure 8:
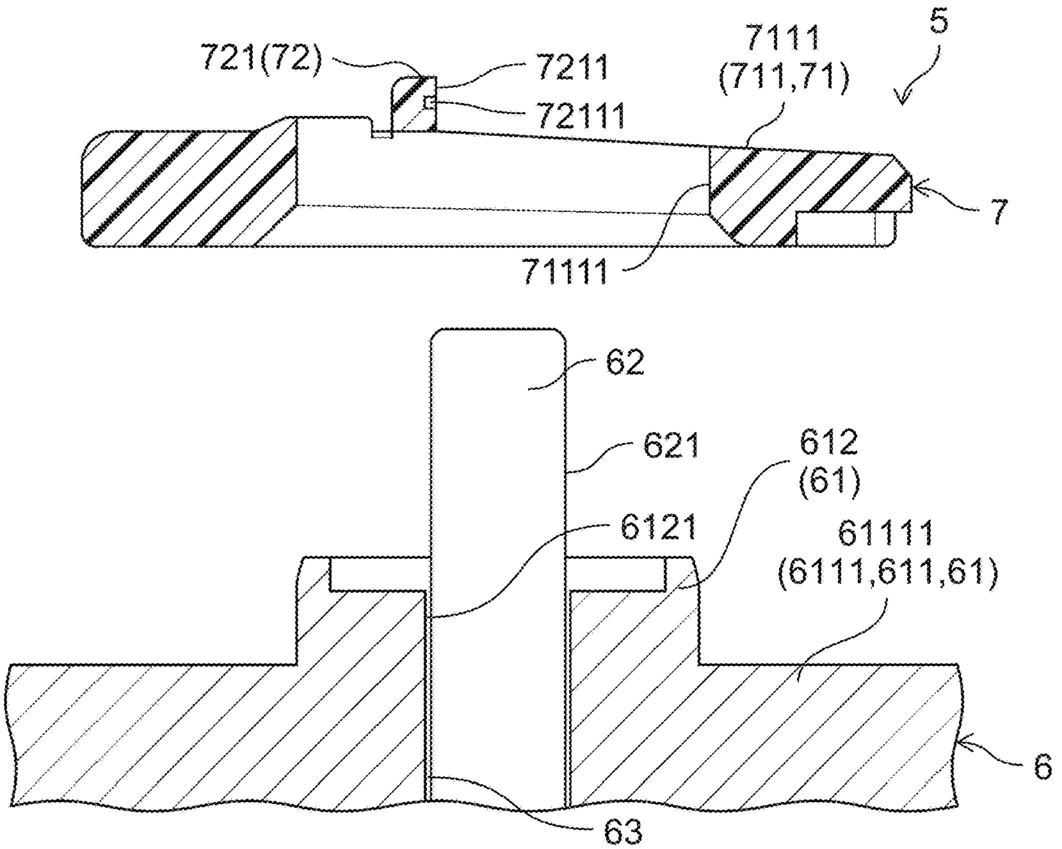
FIG. 8 is an enlarged sectional view illustrating an example of the motor block according to the exemplary embodiment in the state before the motor block member and the rotary motor are integrated.
Figure 9:
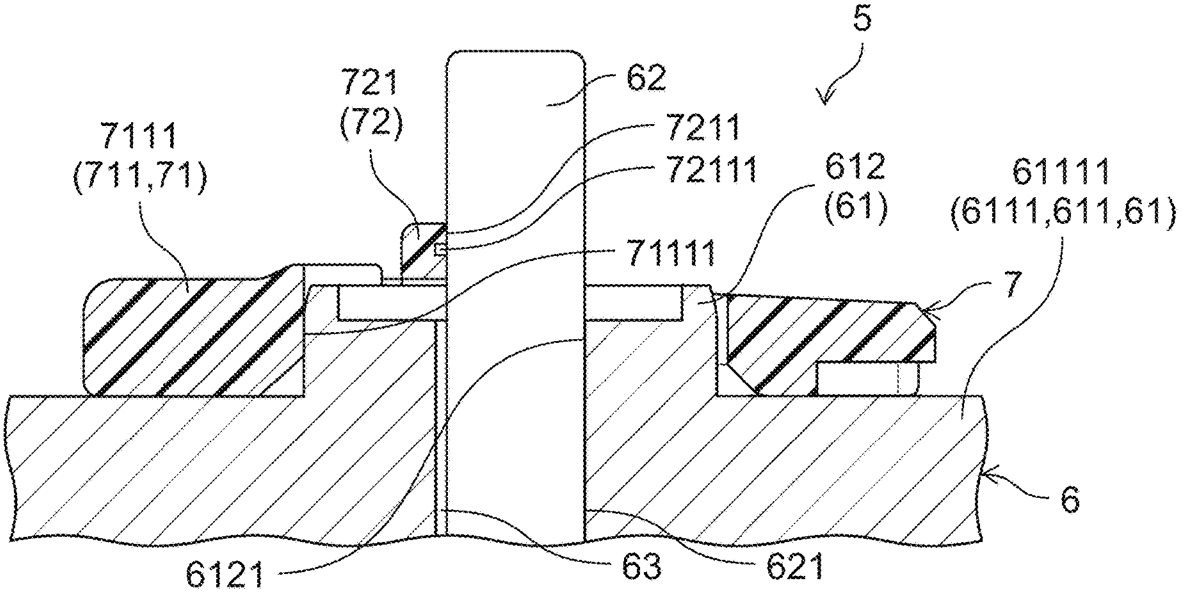
FIG. 9 is an enlarged sectional view illustrating an example of the motor block according to the exemplary embodiment in the state where the motor block member and the rotary motor are integrated.

FIG. 4 is an enlarged perspective view illustrating an example of motor block 5 according to the exemplary embodiment in a state before motor block member 7 and rotary motor 6 are integrated, in an enlarged manner. FIG. 5 is an enlarged perspective view illustrating an example of motor block 5 according to the exemplary embodiment in a state where motor block member 7 and rotary motor 6 are integrated. FIG. 6 is an enlarged front view illustrating an example of motor block 5 according to the exemplary embodiment in the state where motor block member 7 and rotary motor 6 are integrated. FIG. 7 is a plan view illustrating an example of motor block 5 according to the exemplary embodiment in the state where motor block member 7 and rotary motor 6 are integrated. FIG. 8 is an enlarged sectional view illustrating an example of motor block 5 according to the exemplary embodiment in the state before motor block member 7 and rotary motor 6 are integrated. FIG. 9 is an enlarged sectional view illustrating an example of motor block 5 according to the exemplary embodiment in the state where motor block member 7 and rotary motor 6 are integrated. In the present exemplary embodiment, hair clipper 1 is configured to reduce noise during use. Specifically, as illustrated in FIGS. 4 to 9, hair clipper 1 includes shaft stopper 72 that presses rotary shaft 62 in at least one direction in directions intersecting the Z-direction (that is, the first direction and the vertical direction), and a support part (more specifically, body 71, which will be described later) that supports shaft stopper 72. Shaft stopper 72 is configured to restrict shaft shaking during rotation of rotary shaft 62 caused by clearance 63 while allowing rotation of rotary shaft 62.

In the present exemplary embodiment, hair clipper 1 includes rotary motor 6, and motor block member 7 that is formed separately from rotary motor 6 to constitute at least a part of motor block 5 along with rotary motor 6.

As described above, the present exemplary embodiment exemplifies motor block 5 composed of rotary motor 6 and motor block member 7. Motor block 5 is not necessarily composed only of rotary motor 6 and motor block member 7, and may include a member different from rotary motor 6 and motor block member 7.

Rotary motor 6 includes rotary shaft 62 extending in the Z-direction (that is, the first direction and the vertical direction) and motor drive unit 61 capable of rotationally driving rotary shaft 62, and rotary shaft 62 is configured to rotate relative to motor drive unit 61.

In the present exemplary embodiment, motor drive unit 61 includes motor body 611, and bearing 612 that is provided continuously from an upper end of motor body 611 to protrude from motor body 611 in the Z-direction (that is, the first direction and the vertical direction). As illustrated in FIG. 8, rotary shaft 62 is supported by bearing 612 in a state where clearance 63 is provided between inner surface 6121 of bearing 612 and peripheral surface 621 of rotary shaft 62. In this way, rotary shaft 62 is allowed to be rotated relative to motor drive unit 61.

In the present exemplary embodiment, motor body 611 includes motor housing 6111. Motor housing 6111 includes top wall 61111, peripheral wall 61112, and bottom wall 61113. Motor housing 6111 is provided inside with a cavity in which members such as a stator and a rotor are accommodated. The rotor is a member that rotates relative to the stator, and the rotor is integrally provided with rotary shaft 62. Rotary shaft 62 rotates in conjunction with rotation of the rotor.

On the other hand, motor block member 7 includes body 71 integrated with motor drive unit 61, and shaft stopper 72 provided on body 71. As described above, in the present exemplary embodiment, body 71 as a support part is integrated with motor drive unit 61, and motor drive unit 61, the support part (more specifically, body 71), and shaft stopper 72 constitute at least a part of motor block 5.

In the present exemplary embodiment, shaft stopper 72 is configured to press rotary shaft 62 in at least one direction in directions intersecting the Z-direction (that is, the first direction and the vertical direction) in a state where body 71 and motor drive unit 61 are integrated. In the present embodiment, the direction intersecting the Z-direction (that is, the first direction and the vertical direction) means any direction along an XY plane.

Shaft stopper 72 presses rotary shaft 62 in at least one direction in directions intersecting the Z-direction (that is, the first direction and the vertical direction) in a state where body 71 and motor drive unit 61 are integrated, so that shaft shaking during rotation of rotary shaft 62 caused by clearance 63 is restricted while sliding contact of peripheral surface 621 is allowed.

In this way, rotary shaft 62 is allowed to be rotated in a state of suppressing shaft shaking, and thus, interference of rotary shaft 62 with bearing 612 due to the shaft shaking is more reliably suppressed. As described above, when interference of rotary shaft 62 with bearing 612 due to shaft shaking is more reliably suppressed, generation of abnormal noise due to interference between rotary shaft 62 and bearing 612 during shaft shaking is suppressed, and thus noise can be reduced during use of hair clipper 1.

In the present exemplary embodiment, rotary shaft 62 has a distal end part (that is, an upper end part) to which eccentric cam 8 (that is, an example of the conversion mechanism) is attached. Thus, when body 71 and motor drive unit 61 are integrated, shaft stopper 72 is brought into contact with a part of rotary shaft 62, the part protruding below a part connected to cam body 81 of eccentric cam 8 (that is, an example of the conversion mechanism) and above bearing 612.

Additionally, in the present exemplary embodiment, peripheral surface 621 of rotary shaft 62 is brought into contact with bearing 612 in a state where body 71 and motor drive unit 61 are integrated, and thus, rotary shaft is allowed to be rotated in a state where rotary shaft 62 is held between shaft stopper 72 and bearing 612.

Specifically, shaft stopper 72 is composed of one beam 721 extending in a direction intersecting the Z-direction (that is, the first direction and the vertical direction). When body 71 and motor drive unit 61 are integrated, rotary shaft 62 is pressed by sliding contact surface 7211 of beam 721 in the direction orthogonal to the extending direction of beam 721 to bring peripheral surface 621 into contact with inner surface 6121 of bearing 612 in a pressed state.

In this way, shaking of rotary shaft 62 is more reliably suppressed when rotary shaft 62 is rotated, such as when hair clipper 1 is used, and noise is further reduced during use of hair clipper 1.

As described above, when one beam 721 extending in the direction intersecting the Z-direction (that is, the first direction and the vertical direction) is configured to press rotary shaft 62 in one direction, a contact area between shaft stopper 72 and rotary shaft 62 can be reduced as much as possible, and thus, increase in load applied to rotary motor 6 is suppressed when rotary shaft 62 is rotated. As a result, continuous operating time of rotary motor 6 at a predetermined capacitance (e.g., electric capacity of fully charged rechargeable battery 91 or the like) can be relatively increased.

In the present exemplary embodiment, additionally, beam 721 has a double-supported beam structure in which its both ends are connected to body 71, so that when rotary shaft 62 is pressed in one direction, beam 721 can be more reliably prevented from being bent in a direction opposite to the one direction by a reaction force from rotary shaft 62. In this way, shaking of rotary shaft 62 is more reliably suppressed when rotary shaft 62 is rotated, and thus, noise is further reduced during use of hair clipper 1.

Further, in the present exemplary embodiment, beam 721 is also configured to press rotary shaft 62 in the Y-direction (that is, the second direction and the width direction) so that a direction in which beam 721 extends (that is, the X-direction, the third direction, and the front-back direction) is orthogonal to a direction in which movable blade 3222 reciprocates linearly (that is, the Y-direction, the second direction, and the width direction). In this way, rotary shaft 62 is prevented more reliably from moving (such as causing shaft shaking) in the Y-direction (that is, the second direction and the width direction).

Specifically, beam 721 is configured to be allowed to more efficiently receive force (such as force for moving rotary shaft 62 in the Y-direction) applied to rotary shaft 62 when movable blades 3222 are caused to perform reciprocating linear motion in the Y-direction (that is, the second direction and the width direction). Most of the force applied to rotary shaft 62 when movable blades 3222 are caused to perform reciprocating linear motion in the Y-direction (that is, the second direction and the width direction) serves to move rotary shaft 62 in the Y-direction (that is, the second direction and the width direction), namely, serves to cause shaft shaking, for example.

Thus, when extending beam 721 in the direction orthogonal to the direction in which movable blades 3222 performs reciprocating linear motion (that is, the Y-direction, the second direction, and the width direction), rotary shaft 62 is prevented more reliably from moving in the Y-direction (that is, the second direction and the width direction), for example, from causing shaft shaking.

When movement (such as shaft shaking) of rotary shaft 62 in the Y-direction (that is, the second direction and the width direction) during reciprocating linear motion of movable blades 3222 is suppressed, a decrease in amplitude of movable blades 3222 is suppressed. By suppressing the decrease in amplitude of movable blades 3222, cutting ability of hair between movable blades 3222 and fixed blades 3122 is further improved.

Figure 10:
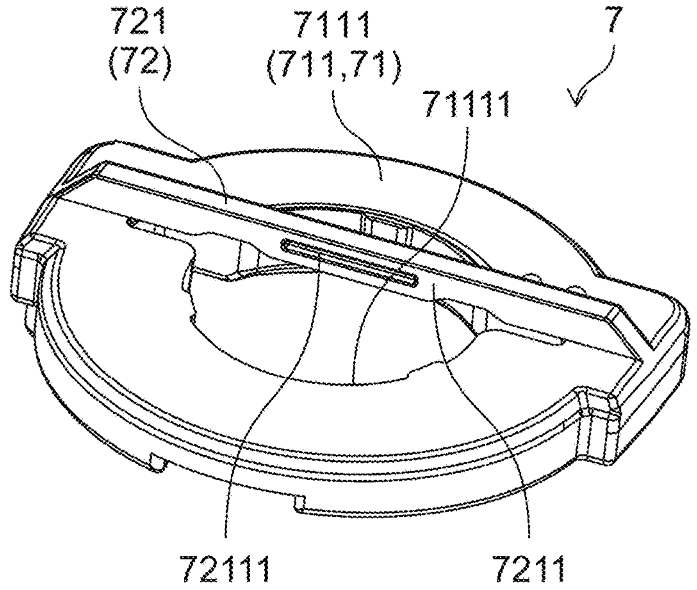
FIG. 10 is a perspective view illustrating an example of the motor block member according to the exemplary embodiment.

Additionally, in the present embodiment, lubricating oil such as grease is applied to rotary shaft 62 and shaft stopper 72 to reduce friction generated between rotary shaft 62 and shaft stopper 72. In this way, effect of reducing friction generated between rotary shaft 62 and shaft stopper 72 can be maintained over a long period of time. FIG. 10 is a perspective view illustrating an example of motor block member 7 according to an exemplary embodiment. Specifically, as illustrated in FIG. 10, recess 72111 is formed in a surface (that is, sliding contact surface 7211) of shaft stopper 72, the surface being in sliding contact with peripheral surface 621. In the present exemplary embodiment, recess 72111 in the shape of a slit extending in the X-direction (that is, the front-back direction and the third direction) is provided in a central part of sliding contact surface 7211 in the Z-direction (that is, the vertical direction and the first direction).

In this way, lubricating oil such as grease is held in recess 72111, and thus, the lubricating oil held in recess 72111 is allowed to be supplied to rotary shaft 62 little by little. As a result, the friction generated between rotary shaft 62 and shaft stopper 72 can be reduced over a long period of time. In other words, the friction reducing structure between rotary shaft 62 and shaft stopper 72 can be maintained over a long period of time.

In the present exemplary embodiment, body 71 includes attachment part 711 attached to motor drive unit 61. In the present exemplary embodiment, attachment part 711 includes annular part 7111 in which insertion hole 71111 into which bearing 612 is inserted is formed. By inserting bearing 612 into insertion hole 71111, body 71 is attached to motor drive unit 61 (more specifically, body 71 is integrated with motor drive unit 61).

As described above, in the present exemplary embodiment, motor block 5 is composed of rotary motor 6 and motor block member 7 which is mounted on rotary motor 6. That is, motor block 5 is formed by attaching motor block member 7 to rotary motor 6. Motor block member 7 capable of forming a single motor block 5 which is independent of housing 4 is used to reduce noise during use of hair clipper 1.

As described above, when motor block 5 is configured independently (more specifically, in such a way that shaft stopper 72 is brought into a state of pressing rotary shaft 62 in a state where of being not incorporated in housing 4 of hair clipper 1), motor block 5 can be more easily formed, and thus enabling stabilized quality and effect of motor block 5.

When attachment part 711 includes annular part 7111 in which insertion hole 71111 into which bearing 612 is inserted is formed, body 71 can be attached to motor drive unit 61 only by inserting bearing 612 into insertion hole 71111, and thus shaft stopper 72 is more easily disposed at a regular position.

Further, in the present exemplary embodiment, body 71 further includes fixing projection 712 (that is, an example of a fixing part) fixed to fixing hole 6111*a* (that is, an example of a fixed part) formed in motor drive unit 61.

Thus, in the present exemplary embodiment, when body 71 is attached to motor drive unit 61, bearing 612 is inserted into insertion hole 71111 provided in annular part 7111, and fixing projection 712 (that is, an example of the fixing part) provided in body 71 is inserted into fixing hole 6111*a* (that is, an example of the fixed part) provided in motor drive unit 61.

In this way, motor block member 7 (more specifically, body 71 and shaft stopper 72) is prevented from being displaced with respect to motor drive unit 61, and thus, shaft stopper 72 restricts shaft shaking more reliably during rotation of rotary shaft 62 caused by clearance 63. As a result, noise during use of hair clipper 1 can be more reliably reduced.

Additionally, motor block member 7 (more specifically, body 71 and shaft stopper 72) can be positioned with respect to motor drive unit 61, so that shaft stopper 72 can be more easily and reliably disposed at a regular position when body 71 and motor drive unit 61 are integrated. As a result, motor block 5 can be stabilized in quality and effect.

Figure 11:
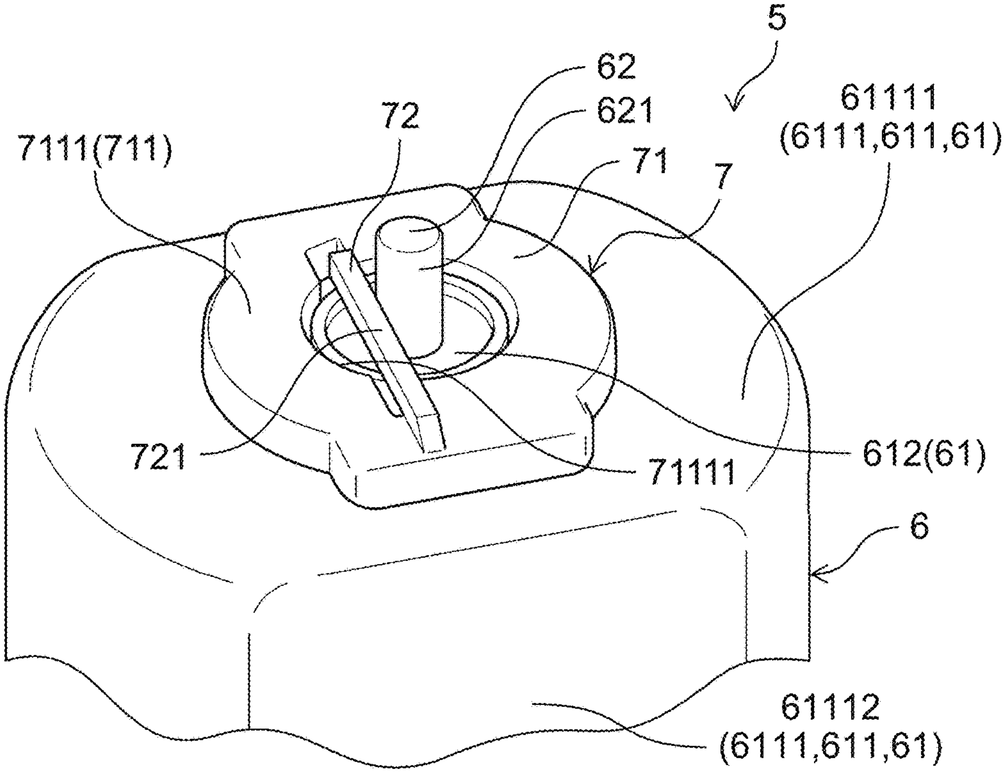
FIG. 11 is an enlarged perspective view illustrating a first modification of the motor block according to the exemplary embodiment in the state where the motor block member and the rotary motor are integrated.

Motor block 5 is not limited to the configuration described in the above exemplary embodiment, and may have various configurations. For example, motor block 5 illustrated in FIG. 11 is available. FIG. 11 is an enlarged perspective view illustrating a first modification of motor block 5 according to the exemplary embodiment in the state where motor block member 7 and rotary motor 6 are integrated.

Motor block 5 illustrated in FIG. 11 also includes rotary motor 6, and motor block member 7 that is composed of a member separate from rotary motor 6 and constitutes at least a part of motor block 5 along with rotary motor 6.

Rotary motor 6 includes rotary shaft 62 extending in the Z-direction (that is, the first direction and the vertical direction), and motor drive unit 61 capable of rotationally driving rotary shaft 62. Motor drive unit 61 includes motor body 611, and bearing 612 that is formed so as to be connected to an upper end of motor body 611 and so as to protrude from motor body 611 in the Z-direction (that is, the first direction and the vertical direction). Rotary shaft 62 is supported by bearing 612 in a state clearance 63 is provided between inner surface 6121 of bearing 612 and peripheral surface 621 of rotary shaft 62.

Motor block member 7 includes body 71 integrated with motor drive unit 61, and shaft stopper 72 provided on body 71. Shaft stopper 72 is also configured to press rotary shaft 62 in at least one direction in directions intersecting the Z-direction (that is, the first direction and the vertical direction) in the state where body 71 and motor drive unit 61 are integrated.

Shaft stopper 72 presses rotary shaft 62 in at least one direction in directions intersecting the Z-direction (that is, the first direction and the vertical direction) in the state where body 71 and motor drive unit 61 are integrated, so that shaft shaking during rotation of rotary shaft 62 caused by clearance 63 is restricted while sliding contact of peripheral surface 621 is allowed.

Shaft stopper 72 is composed of one beam 721 extending in a direction intersecting the Z-direction (that is, the first direction and the vertical direction), and peripheral surface 621 of rotary shaft 62 is brought into contact with bearing 612 in the state where body 71 and motor drive unit 61 are integrated.

Beam 721 is also configured to press rotary shaft 62 in the Y-direction (that is, the second direction and the width direction) so that a direction in which beam 721 extends (that is, the X-direction, the third direction, and the front-back direction) and a direction in which movable blade 3222 reciprocates linearly (that is, the Y-direction, the second direction, and the width direction) are orthogonal to each other. In this way, rotary shaft 62 is prevented more reliably from moving (such as causing shaft shaking) in the Y-direction (that is, the second direction and the width direction).

Body 71 includes attachment part 711 attached to motor drive unit 61, and attachment part 711 includes annular part 7111 provided with insertion hole 71111 into which bearing 612 is inserted.

As described above, motor block 5 illustrated in FIG. 11 also can be configured independently (more specifically, shaft stopper 72 is brought into a state of pressing rotary shaft 62 in a state of being not incorporated in housing 4 of hair clipper 1).

When motor block 5 illustrated in FIG. 11 is incorporated in the housing 4, hair clipper 1 is formed including shaft stopper 72 that presses rotary shaft 62 in at least one direction in directions intersecting the Z-direction (that is, the first direction and the vertical direction), and a support part (more specifically, body 71) that supports shaft stopper 72.

Here, motor block 5 illustrated in FIG. 11 includes beam 721 that is connected at only one end to body 71 to form a cantilever beam structure.

In this way, beam 721 is allowed to be more easily elastically deformed than a double-supported beam structure, and thus, a dimensional error of motor block member 7 or the like is absorbed by elastic deformation of beam 721. As described above, when a dimensional error of motor block member 7 or the like can be absorbed by elastic deformation of beam 721, motor block 5 can be more easily formed.

Motor block 5 illustrated in FIG. 11 preferably includes recess 72111 formed on a surface (that is, sliding contact surface 7211) of shaft stopper 72, the surface being in sliding contact with peripheral surface 621.

In addition, body 71 preferably includes fixing projection 712 (that is, an example of a fixing part) fixed to fixing hole 6111*a* (that is, an example of a fixed part) formed in motor drive unit 61.

Figure 12:
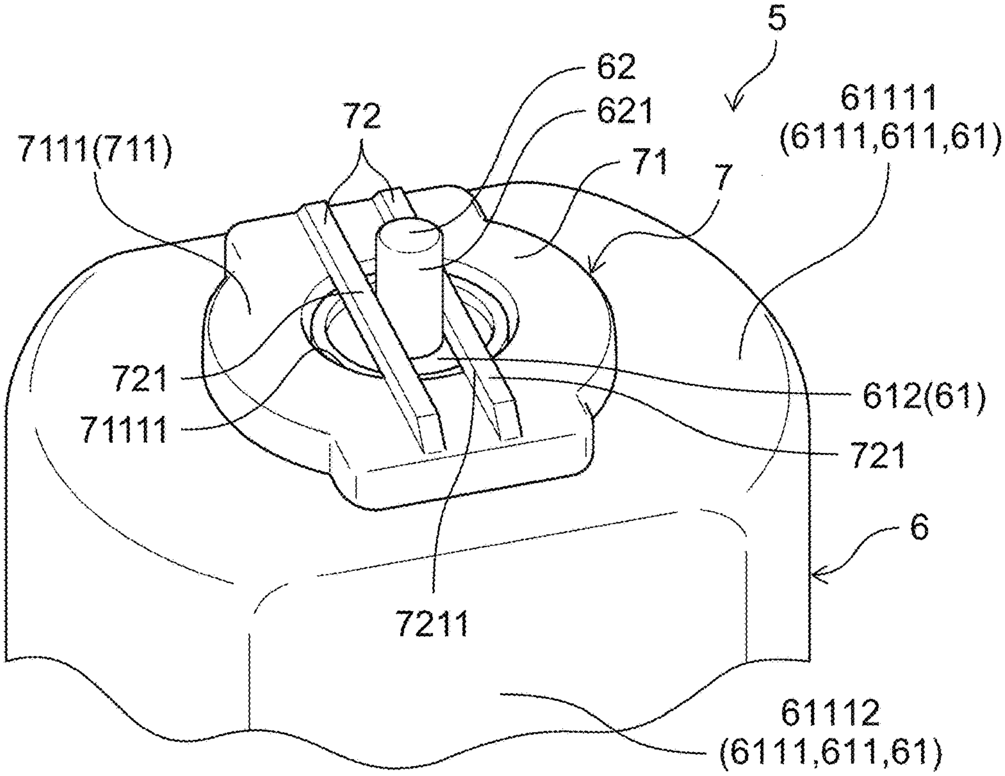
FIG. 12 is an enlarged perspective view illustrating a second modification of the motor block according to the exemplary embodiment in the state where the motor block member and the rotary motor are integrated.

Motor block 5 illustrated in FIG. 12 is also available. FIG. 12 is an enlarged perspective view illustrating a second modification of motor block 5 according to the exemplary embodiment in the state where motor block member 7 and rotary motor 6 are integrated.

Motor block 5 illustrated in FIG. 12 also includes rotary motor 6, and motor block member 7 that is composed of a member separate from rotary motor 6 and constitutes at least a part of motor block 5 along with rotary motor 6.

Rotary motor 6 includes rotary shaft 62 extending in the Z-direction (that is, the first direction and the vertical direction), and motor drive unit 61 capable of rotationally driving rotary shaft 62. Motor drive unit 61 includes motor body 611, and bearing 612 that is formed so as to be connected to an upper end of motor body 611 and so as to protrude from motor body 611 in the Z-direction (that is, the first direction and the vertical direction). Rotary shaft 62 is supported by bearing 612 in a state where clearance 63 is provided between inner surface 6121 of bearing 612 and peripheral surface 621 of rotary shaft 62.

Motor block member 7 includes body 71 integrated with motor drive unit 61, and shaft stopper 72 provided on body 71. Shaft stopper 72 is also configured to press rotary shaft 62 in at least one direction in directions intersecting the Z-direction (that is, the first direction and the vertical direction) in the state where body 71 and motor drive unit 61 are integrated.

Shaft stopper 72 presses rotary shaft 62 in at least one direction in directions intersecting the Z-direction (that is, the first direction and the vertical direction) in the state where body 71 and motor drive unit 61 are integrated, so that shaft shaking during rotation of rotary shaft 62 caused by clearance 63 is restricted while sliding contact of peripheral surface 621 is allowed.

Body 71 includes attachment part 711 attached to motor drive unit 61, and attachment part 711 includes annular part 7111 provided with insertion hole 71111 into which bearing 612 is inserted.

As described above, motor block 5 illustrated in FIG. 12 also can be configured independently (more specifically, shaft stopper 72 can be brought into a state of pressing rotary shaft 62 in the state of being not incorporated in housing 4 of hair clipper 1).

When motor block 5 illustrated in FIG. 12 is incorporated in the housing 4, hair clipper 1 is formed including shaft stopper 72 that presses rotary shaft 62 in at least one direction in directions intersecting the Z-direction (that is, the first direction and the vertical direction), and a support part (more specifically, body 71) that supports shaft stopper 72.

Here, motor block 5 illustrated in FIG. 12 includes rotary shaft 62 held between a pair of shaft stoppers 72 in the state where body 71 and motor drive unit 61 are integrated. Specifically, the pair of shaft stoppers 72 are composed of two beams 721 extending in a direction intersecting the Z-direction (that is, the first direction and the vertical direction).

In this way, rotary shaft 62 is allowed to be rotated in a state where rotary shaft 62 is held by the pair of shaft stoppers 72, and thus, shaft shaking of rotary shaft 62 is suppressed more reliably when rotary shaft 62 is rotated, such as when hair clipper 1 is used. Thus, noise is further reduced during use of hair clipper 1.

Beam 721 is also configured to press rotary shaft 62 in the Y-direction (that is, the second direction and the width direction) so that a direction in which beam 721 extends (that is, the X-direction, the third direction, and the front-back direction) is orthogonal to a direction in which movable blade 3222 reciprocates linearly (that is, the Y-direction, the second direction, and the width direction). In the way, rotary shaft 62 is prevented more reliably from moving (such as causing shaft shaking) in the Y-direction (that is, the second direction and the width direction).

Each of two beams 721 has a double-supported beam structure. Alternatively, one beam 721 of two beams 721 may have a cantilever beam structure in which one beam 721 is connected at only one end to body 71.

Alternatively, both of two beams 721 may have a cantilever beam structure in which two beams 721 are each connected at only one end to body 71. At this time, end parts of two beams 721 connected to body 71 may located on the same side or on opposite sides.

Motor block 5 illustrated in FIG. 12 also preferably includes recess 72111 formed on a surface (that is, sliding contact surface 7211) of shaft stopper 72, the surface being in sliding contact with peripheral surface 621.

Body 71 preferably includes fixing projection 712 (that is, an example of a fixing part) fixed to fixing hole 6111*a* (that is, an example of a fixed part) formed in motor drive unit 61.

Figure 13:
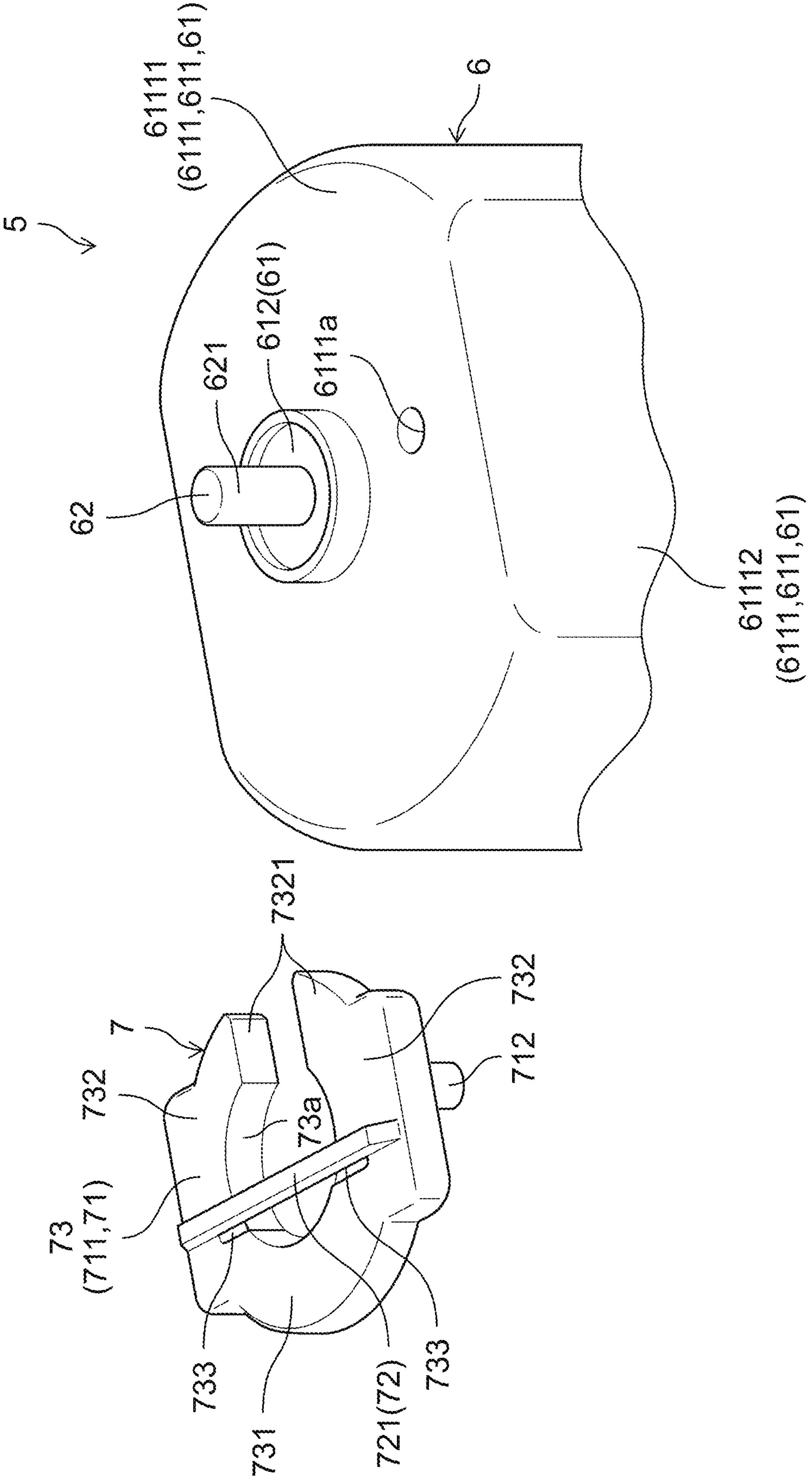
FIG. 13 is an enlarged perspective view illustrating a third modification of the motor block according to the exemplary embodiment in the state before the motor block member and the rotary motor are integrated.
Figure 14:
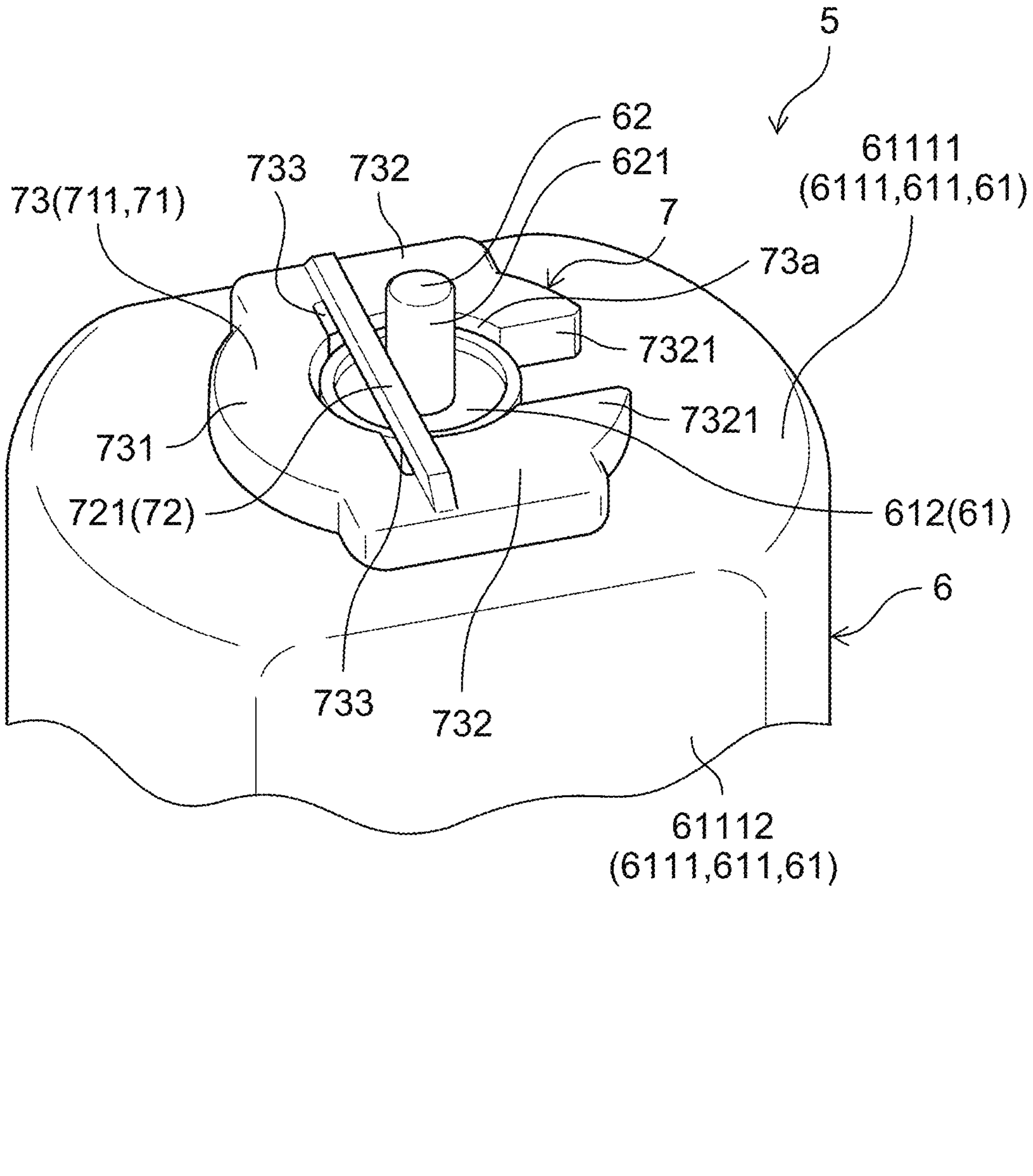
FIG. 14 is an enlarged perspective view illustrating the third modification of the motor block according to the exemplary embodiment in the state where the motor block member and the rotary motor are integrated.

Motor blocks 5 illustrated in FIGS. 13 and 14 are also available. FIG. 13 is an enlarged perspective view illustrating a third modification of motor block 5 according to the exemplary embodiment in the state before motor block member 7 and rotary motor 6 are integrated. FIG. 14 is an enlarged perspective view illustrating a third modification of motor block 5 according to the exemplary embodiment in the state where motor block member 7 and rotary motor 6 are integrated.

Motor block 5 illustrated in each of FIGS. 13 and 14 also includes rotary motor 6, and motor block member 7 that is composed of a member separate from rotary motor 6 and constitutes at least a part of motor block 5 along with rotary motor 6.

Rotary motor 6 includes rotary shaft 62 extending in the Z-direction (that is, the first direction and the vertical direction), and motor drive unit 61 capable of rotationally driving rotary shaft 62. Motor drive unit 61 includes motor body 611, and bearing 612 that is formed so ss to be connected to an upper end of motor body 611 and so as to protrude from motor body 611 in the Z-direction (that is, the first direction and the vertical direction). Rotary shaft 62 is supported by bearing 612 in the state where clearance 63 is provided between inner surface 6121 of bearing 612 and peripheral surface 621 of rotary shaft 62.

Motor block member 7 includes body 71 integrated with motor drive unit 61, and shaft stopper 72 provided on body 71. Shaft stopper 72 is also configured to press rotary shaft 62 in at least one direction in directions intersecting the Z-direction (that is, the first direction and the vertical direction) in the state where body 71 and motor drive unit 61 are integrated.

Shaft stopper 72 presses rotary shaft 62 in at least one direction in directions intersecting the Z-direction (that is, the first direction and the vertical direction) in the state where body 71 and motor drive unit 61 are integrated, so that shaft shaking during rotation of rotary shaft 62 caused by clearance 63 is restricted while sliding contact of peripheral surface 621 is allowed.

Body 71 includes attachment part 711 attached to motor drive unit 61, and attachment part 711 includes annular part 7111 provided with insertion hole 71111 into which bearing 612 is inserted.

As described above, motor block 5 illustrated in each of FIGS. 13 and 14 also can be configured independently (more specifically, shaft stopper 72 can be brought into a state of pressing rotary shaft 62 in the state of being not incorporated in housing 4 of hair clipper 1).

When motor block 5 illustrated in each of FIGS. 13 and 14 is incorporated in the housing 4, hair clipper 1 is formed including shaft stopper 72 that presses rotary shaft 62 in at least one direction in directions intersecting the Z-direction (that is, the first direction and the vertical direction), and a support part (more specifically, body 71) that supports shaft stopper 72.

Shaft stopper 72 is composed of one beam 721 extending in a direction intersecting the Z-direction (that is, the first direction and the vertical direction), and peripheral surface 621 of rotary shaft 62 is brought into contact with bearing 612 in the state where body 71 and motor drive unit 61 are integrated.

One beam 721 has a double-supported beam structure. Alternatively, one beam 721 may have a cantilever beam structure in which one beam 721 is connected at only one end to body 71. Rotary shaft 62 may be held between a pair of shaft stoppers 72 in the state where body 71 and motor drive unit 61 are integrated.

Beam 721 is also configured to press rotary shaft 62 in the Y-direction (that is, the second direction and the width direction) so that a direction in which beam 721 extends (that is, the X-direction, the third direction, and the front-back direction) is orthogonal to a direction in which movable blade 3222 reciprocates linearly (that is, the Y-direction, the second direction, and the width direction). In this way, rotary shaft 62 is prevented more reliably from moving (such as causing shaft shaking) in the Y-direction (that is, the second direction and the width direction).

Body 71 includes fixing projection 712 (that is, an example of a fixing part) fixed to fixing hole 6111*a* (that is, an example of a fixed part) formed in motor drive unit 61.

Here, in motor block 5 illustrated in FIGS. 13 and 14, attachment part 711 has a C-shaped part 73 attached to bearing 612 in a state where a pair of the distal ends 7321 thereof are separated in the circumferential direction thereof. In motor block 5 illustrated in FIGS. 13 and 14, C-shaped part 73 includes base part 731 and a pair of arm parts 732 connected to both ends of base part 731. Cutout 733 is formed at a connection part between base part 731 and each of arm parts 732. In this way, C-shaped part 73 is allowed to elastically deform the pair of arm parts 732 in a direction in which distal ends 7321 are separated. That is, C-shaped part 73 is configured to elastically deform inner surface 73*a* in such a way that inner surface 73*a* is expanded and contracted.

By providing C-shaped part 73 as described above, attachment and detachment work of body 71 to and from motor drive unit 61 are allowed to be performed in a state where eccentric cam 8 (that is, an example of the conversion mechanism) is connected to rotary shaft 62. As described above, By connecting eccentric cam 8 (that is, an example of the conversion mechanism) to rotary shaft 62 before body 71 is attached to motor drive unit 61, motor block member 7 is prevented from being displaced with respect to rotary motor 6 or from being damaged during work of connecting eccentric cam 8 (that is, an example of the conversion mechanism) to rotary shaft 62. As a result, hair clipper 1 can be stabilized in quality and effect.

When body 71 includes fixing projection 712 (that is, an example of the fixed part) fixed to fixing hole 6111*a* (that is, an example of the fixing part) formed in motor drive unit 61, motor block member 7 is attached to rotary motor 6 by moving motor block member 7 in a direction along the XY plane to cause peripheral surface 621 of rotary shaft 62 to face inner surface 73*a* of C-shaped part 73, and then moving motor block member 7 downward to insert fixing projection 712 (that is, an example of the fixing part) into fixing holes 6111*a* (that is, an example of the fixed part).

Thus, when body 71 includes fixing projection 712 (that is, an example of the fixing part) fixed to fixing hole 6111*a* (that is, an example of the fixed part) formed in motor drive unit 61, C-shaped part 73 does not need to be configured to be elastically deformed in the direction in which the pair of distal ends 7321 is separated as long as a distance between distal ends 7321 of the pair of arm parts 732 is larger than a diameter of rotary shaft 62.

Motor block 5 illustrated in FIGS. 13 and 14 also preferably includes recess 72111 formed on a surface (that is, sliding contact surface 7211) of shaft stopper 72, the surface being in sliding contact with peripheral surface 621.

Figure 15:
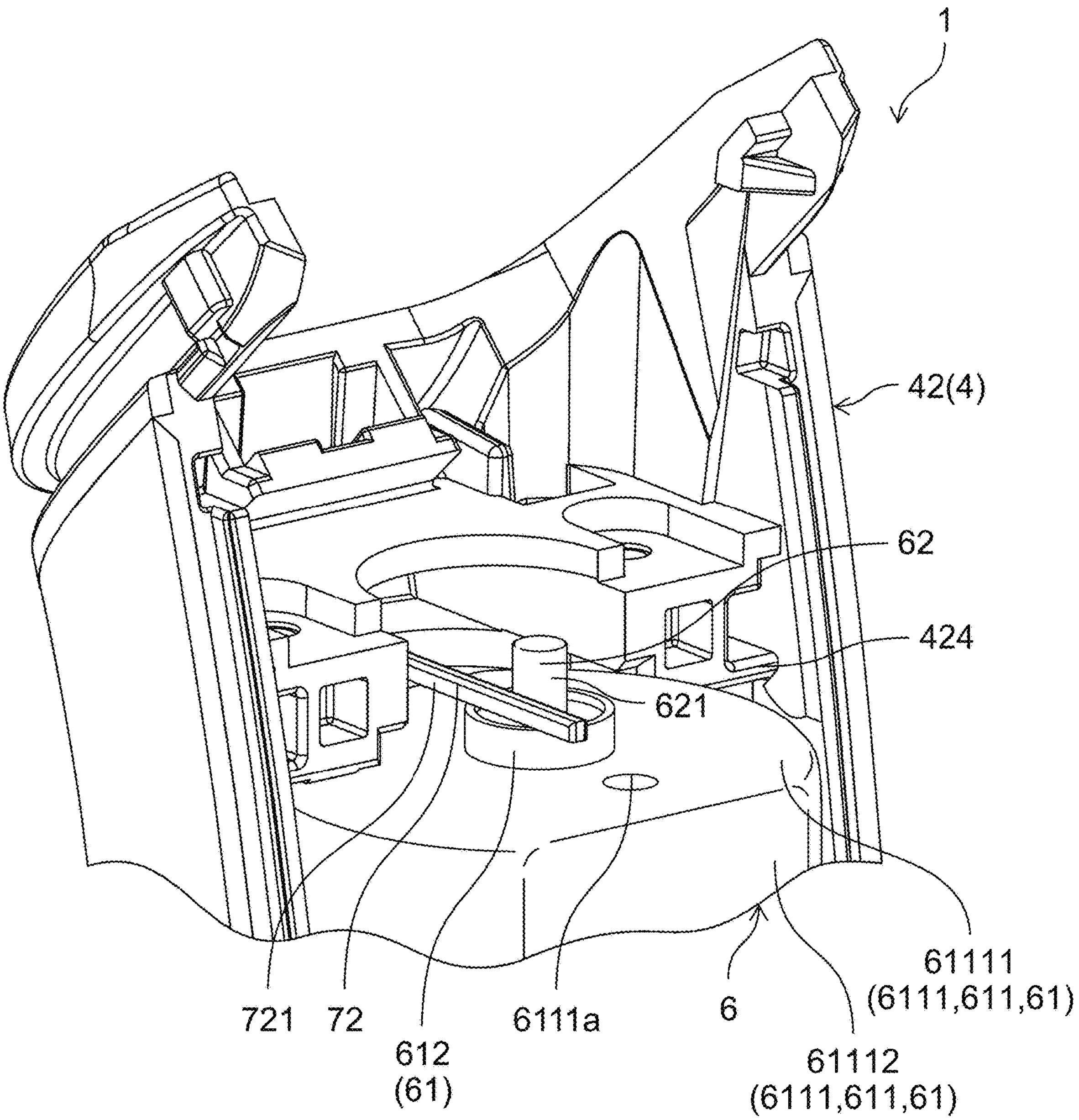
FIG. 15 is an enlarged perspective view illustrating a modification of the hair clipper according to the exemplary embodiment in the state where the rotary motor is assembled to a second split housing.

Hair clipper 1 having a configuration illustrated in FIG. 15 is also available. FIG. 15 is an enlarged perspective view illustrating a modification of hair clipper 1 according to the exemplary embodiment in a state where rotary motor 6 is assembled to second split housing 42.

Hair clipper 1 in a configuration illustrated in FIG. 15 includes shaft stopper 72 that presses rotary shaft 62 in at least one direction in directions intersecting the Z-direction (that is, the first direction and the vertical direction), and a support part that supports shaft stopper 72. Shaft stopper 72 is configured to restrict shaft shaking during rotation of rotary shaft 62 caused by clearance 63 while allowing rotation of rotary shaft 62.

Rotary motor 6 in the configuration illustrated in FIG. 15 also includes rotary shaft 62 extending in the Z-direction (that is, the first direction and the vertical direction), and motor drive unit 61 capable of rotationally driving rotary shaft 62. Motor drive unit 61 includes motor body 611, and bearing 612 that is formed connected to an upper end of motor body 611 and protruding from motor body 611 in the Z-direction (that is, the first direction and the vertical direction). Rotary shaft 62 is supported by bearing 612 in a state where clearance 63 is provided between inner surface 6121 of bearing 612 and peripheral surface 621 of rotary shaft 62.

Here, housing 4 in FIG. 15 is provided with a support part. Specifically, rotary shaft 62 is pressed in the Y-direction (that is, the second direction and the width direction) by beam 721 of shaft stopper 72 supported by second split housing 42 in a state where rotary motor 6 is held by motor holder 424 formed in second split housing 42.

As described above, when rotary motor 6 is incorporated into housing 4 in the configuration illustrated in FIG. 15, rotary shaft 62 is first pressed in the Y-direction (that is, the second direction and the width direction) by beam 721 of shaft stopper 72.

Shaft stopper 72 may be formed integrally with second split housing 42 as housing 4. In this case, second split housing 42 functions as a support part. Alternatively, an end part of shaft stopper 72 formed of a member different from second split housing 42 may be fitted to a fitting part formed in second split housing 42. In this case, the fitting part formed in second split housing 42 functions as a support part.

Shaft stopper 72 in the configuration illustrated in FIG. 15 is also configured to press rotary shaft 62 in at least one direction in directions intersecting the Z-direction (that is, the first direction and the vertical direction) in a state where rotary motor 6 is incorporated in housing 4.

Shaft stopper 72 presses rotary shaft 62 in at least one direction in directions intersecting the Z-direction (that is, the first direction and the vertical direction) in the state where rotary motor 6 is incorporated in housing 4, so that shaft shaking during rotation of rotary shaft 62 caused by clearance 63 is restricted while sliding contact of peripheral surface 621 is allowed.

Shaft stopper 72 is composed of one beam 721 extending in a direction intersecting the Z-direction (that is, the first direction and the vertical direction), and peripheral surface 621 of rotary shaft 62 is brought into contact with bearing 612 in the state where rotary motor 6 is incorporated in housing 4.

Beam 721 is also configured to press rotary shaft 62 in the Y-direction (that is, the second direction and the width direction) so that a direction in which beam 721 extends (that is, the X-direction, the third direction, and the front-back direction) is orthogonal to a direction in which movable blade 3222 reciprocates linearly (that is, the Y-direction, the second direction, and the width direction). In this way, rotary shaft 62 is prevented from moving (such as causing shaft shaking) in the Y-direction (that is, the second direction and the width direction) more reliably.

In this way, motor block member 7 is not required to be prepared separately from housing 4, and noise during use of hair clipper 1 is reduced, while simplifying the configuration and reducing cost.

Beam 721 may have a cantilever beam structure in which only one end thereof is connected to body 71, or a double-supported beam structure in which shaft stopper 72 has a distal end fixed to first split housing 41 when housing 4 is formed.

Shaft stopper 72 in the configuration illustrated in FIG. 15 also preferably includes a surface (that is, sliding contact surface 7211) provided with recess 72111, the surface being in sliding contact with peripheral surface 621.

[Operation and Effect]

Hereinafter, a characteristic configuration of the hair clipper and the motor block used in the hair clipper described in the exemplary embodiment and the modifications of the exemplary embodiment, and effect obtained by the characteristic configuration, will be described.

(Technique 1) Hair clipper 1 described in the exemplary embodiment and the modifications of the exemplary embodiment includes rotary motor 6 having rotary shaft 62 extending in the Z-direction (that is, the first direction and the vertical direction), and motor drive unit 61 configured to enable rotary shaft 62 to be rotationally driven. Hair clipper 1 also includes: a conversion mechanism (e.g., eccentric cam 8) that is connected to rotary shaft 62 and is capable of converting rotational motion of rotary shaft 62 into reciprocating linear motion; movable blades 3222 that are connected to the conversion mechanism (e.g., eccentric cam 8) and are capable of reciprocating linear motion; and fixed blades 3122 with which movable blades 3222 are capable of coming into sliding contact.

Further, hair clipper 1 includes bearing 612 that is provided in motor drive unit 61 to support rotary shaft 62 in a state where clearance 63 is provided between peripheral surface 621 of rotary shaft 62 and bearing 612.

Hair clipper 1 includes: shaft stopper 72 that presses rotary shaft 62 in at least one direction in directions intersecting the Z-direction (that is, the first direction and the vertical direction) to restrict shaft shaking during rotation of rotary shaft 62 caused by clearance 63 while allowing rotation of rotary shaft 62; and a support part (more specifically, body 71 and second split housing 42) that supports shaft stopper 72.

As described above, in the exemplary embodiment described above and the modifications thereof, shaft stopper 72 is configured to restrict shaft shaking during rotation of rotary shaft 62 caused by clearance 63.

In this way, rotary shaft 62 is allowed to be rotated in a state of suppressing shaft shaking, and thus, interference of rotary shaft 62 with bearing 612 due to the shaft shaking is suppressed more reliably. As a result, generation of abnormal noise due to interference between rotary shaft 62 and bearing 612 during shaft shaking is suppressed, and noise can be reduced during use of hair clipper 1.

As described above, in hair clipper 1 described in the exemplary embodiment and the modifications of the exemplary embodiment, generation of abnormal noise during use of hair clippers 1 is suppressed more reliably, and noise during use of hair clipper is reduced.

(Technique 2) The above (Technique 1) may be configured such that the support part (more specifically, body 71) is integrated with motor drive unit 61, and that motor drive unit 61, the support part (more specifically, body 71), and shaft stopper 72 constitute at least a part of motor block 5.

As described above, when motor drive unit 61, the support part (more specifically, body 71), and shaft stopper 72 constitute at least a part of motor block 5, motor block 5 can be configured independently (more specifically, shaft stopper 72 can be brought into a state of pressing rotary shaft 62 in a state of being not incorporated in housing 4 of hair clipper 1). In this way, pressing force against rotary shaft 62 generated by shaft stopper 72 is allowed to be adjusted more easily, and thus, motor block 5 is allowed to be stabilized in quality and effect.

When hair clipper 1 is manufactured by incorporating motor block 5 as described above into housing 4, the pressing force against rotary shaft 62 generated by shaft stopper 72 is prevented from changing due to an assembly error of rotary motor 6 to housing 4 as in a case where shaft stopper 72 presses rotary shaft 62 when rotary motor 6 is incorporated in housing 4. Thus, hair clipper 1 capable of reducing noise during use can be obtained more easily and reliably.

(Technique 3) The above (Technique 2) may be configured such that peripheral surface 621 of rotary shaft 62 is brought into contact with bearing 612 in a state where the support part (more specifically, body 71) and motor drive unit 61 are integrated.

In this way, rotary shaft 62 is allowed to be rotated in a state where rotary shaft 62 is held by shaft stopper 72 and bearing 612, and thus, shaft shaking of rotary shaft 62 is suppressed more reliably when rotary shaft 62 is rotated, such as when hair clipper 1 is used. As a result, noise during use of hair clipper 1 can be further reduced.

(Technique 4) The above (Technique 2) may be also configured such that hair clipper 1 includes a pair of shaft stoppers 72, and that rotary shaft 62 is held between the pair of shaft stoppers 72 in the state where the support part (more specifically, body 71) and motor drive unit 61 are integrated.

In this way, rotary shaft 62 is allowed to be rotated in a state where rotary shaft 62 is held by the pair of shaft stoppers 72, and thus, shaft shaking of rotary shaft 62 is suppressed more reliably when rotary shaft 62 is rotated, such as when hair clipper 1 is used. As a result, noise during use of hair clipper 1 can be further reduced.

(Technique 5) Any one of the above (Technique 1) to (Technique 4) may be configured such that shaft stopper 72 is beam 721 extending in a direction intersecting the Z-direction (that is, the first direction and the vertical direction).

In this way, contact area between shaft stopper 72 and rotary shaft 62 is reduced as much as possible, and thus, increase in load applied to rotary motor 6 is suppressed when rotary shaft 62 is rotated. As a result, continuous operating time of rotary motor 6 at a predetermined capacitance (e.g., electric capacity of fully charged rechargeable battery 91) can be relatively increased.

(Technique 6) The above (Technique 5) may be configured such that beam 721 has a double-supported beam structure.

In this way, beam 721 is prevented more reliably from being deflected by reaction force from rotary shaft 62, and thus, shaft shaking of rotary shaft 62 is suppressed more reliably when rotary shaft 62 is rotated. As a result, noise during use of hair clipper 1 can be further reduced.

(Technique 7) The above (Technique 5) may be also configured such that beam 721 has a cantilever beam structure.

In this way, beam 721 is allowed to be configured to be more easily elastically deformed, and thus, a dimensional error of motor block member 7 is allowed to be absorbed by elastic deformation of beam 721. As a result, motor block 5 can be formed more easily.

(Technique 8) Any one of the above (Technique 5) to (Technique 7) may be configured such that a direction in which beam 721 extends (that is, the X direction, the third direction, and the front-back direction) is orthogonal to a direction in which movable blades 3222 performs reciprocating linear motion (that is, the Y direction, the second direction, and the width direction).

In this way, beam 721 presses rotary shaft 62 in the Y-direction (that is, the second direction and the width direction), and thus, movement (that is, generation of shaft shaking) of rotary shaft 62 in the Y-direction (that is, the second direction and the width direction) is suppressed more reliably.

Most of the force applied to rotary shaft 62 when movable blades 3222 are caused to perform reciprocating linear motion in the Y-direction (that is, the second direction and the width direction) serves to move rotary shaft 62 in the Y-direction (that is, the second direction and the width direction). For example, such a force serves to cause shaft shaking. For this reason, when beam 721 is extended in a direction orthogonal to a direction in which movable blades 3222 performs reciprocating linear motion (that is, the Y-direction, the second direction, and the width direction), beam 721 can more efficiently receive force applied to rotary shaft 62 when movable blades 3222 are caused to perform the reciprocating linear motion.

Thus, by extending beam 721 in the direction orthogonal to the direction in which movable blades 3222 performs the reciprocating linear motion (that is, the Y-direction, the second direction, and the width direction), rotary shaft 62 is prevented more reliably from moving in the Y-direction (that is, the second direction and the width direction). As one example, rotary shaft 62 is prevented more reliably from causing shaft shaking.

When movement (such as shaft shaking) of rotary shaft 62 in the Y-direction (that is, the second direction and the width direction) during reciprocating linear motion of movable blades 3222 is suppressed, a decrease in amplitude of movable blades 3222 is suppressed. Suppressing the decrease in amplitude of movable blades 3222 is advantageous in that cutting ability of hair between movable blades 3222 and fixed blades 3122 can be further improved.

(Technique 9) Any one of the above (Technique 1) to (Technique 8) may be configured such that shaft stopper 72 has a surface (that is, sliding contact surface 7211) provided with recess 72111, the surface being in sliding contact with peripheral surface 621.

In this way, lubricating oil such as grease is allowed to be held in recess 72111, and thus, the lubricating oil held in recess 72111 is allowed to be supplied to rotary shaft 62 little by little. As a result, friction generated between rotary shaft 62 and shaft stopper 72 can be reduced over a long period of time. That is, friction reduction structure between rotary shaft 62 and shaft stopper 72 can be maintained over a long period of time.

(Technique 10) Any one of the above (Technique 1) to (Technique 9) may be configured such that the support part (more specifically, body 71 and second split housing 42) includes attachment part 711 attached to motor drive unit 61.

In this way, motor block 5 is allowed to be configured independently (more specifically, shaft stopper 72 can be brought into a state of pressing rotary shaft 62 while being not incorporated in housing 4 of hair clipper 1), and thus, motor block 5 is allowed to be formed more easily. In addition, motor block 5 can be stabilized in quality and effect.

(Technique 11) The above (Technique 10) may be configured such that motor drive unit 61 further includes motor body 611, and that bearing 612 that is formed protruding from motor body 611 in the Z-direction (that is, the first direction and the vertical direction). Attachment part 711 may include annular part 7111 provided with insertion hole 71111 into which bearing 612 is inserted.

In this way, body 71 is allowed to be attached to motor drive unit 61 only by inserting bearing 612 into insertion hole 71111, and thus, shaft stopper 72 is allowed to be more easily disposed at a regular position.

(Technique 12) The above (Technique 10) may be configured such that motor drive unit 61 further includes motor body 611, and bearing 612 that is formed so as to protrude from motor body 611 in the Z-direction (that is, the first direction and the vertical direction). In addition, attachment part 711 may include C-shaped part 73 attached to bearing 612 in a state where a pair of distal ends 7321 are separated in the circumferential direction thereof.

In this way, attachment and detachment work of body 71 to and from motor drive unit 61 are allowed to be performed in a state where eccentric cam 8 (that is, an example of the conversion mechanism) is connected to rotary shaft 62. As described above, by connecting the conversion mechanism (such as eccentric cam 8) to rotary shaft 62 before body 71 is attached to motor drive unit 61, motor block member 7 is prevented from being displaced with respect to rotary motor 6 or from being damaged during work of connecting the conversion mechanism (such as eccentric cam 8) to rotary shaft 62. As a result, hair clipper 1 can be stabilized in quality and effect.

(Technique 13) Any one of the above (Technique 1) to (Technique 12) may be configured such that the support part (more specifically, body 71 and second split housing 42) includes fixing projection 712 (that is, an example of the fixing part) fixed to fixing hole 6111*a* (that is, an example of the fixed part) formed in motor drive unit 61.

In this way, motor block member 7 (more specifically, body 71 and shaft stopper 72) is prevent from being displaced with respect to motor drive unit 61, and thus shaft stopper 72 restricts shaft shaking during rotation of rotary shaft 62 caused by clearance 63 more reliably. As a result, noise during use of hair clipper 1 can be more reliably reduced.

Additionally, motor block member 7 (more specifically, body 71 and shaft stopper 72) can be positioned with respect to motor drive unit 61, so that shaft stopper 72 can be more easily and reliably disposed at a regular position when body 71 and motor drive unit 61 are integrated. As a result, motor block 5 can be stabilized in quality and effect.

(Technique 14) Any one of the above (Technique 1), and (Technique 3) to (Technique 12) may be configured to further include housing 4 provided with motor holder 424 that holds rotary motor 6. The support part (more specifically, second split housing 42) may be formed in housing 4.

In this way, motor block member 7 is not required to be prepared separately from housing 4, and thus, noise during use of hair clipper 1 is reduced while simplifying the configuration and reducing cost.

(Technique 15) Motor block 5 described in the exemplary embodiment described above and the modifications of the exemplary embodiment is used in hair clipper 1 described in any one of the above (Technique 2) to (Technique 13).

By using motor block 5 as described above, noise during use of hair clipper 1 is reduced.

[Others]

Although the contents of the hair clipper and the motor block used in the hair clipper according to the present disclosure have been described above, the present disclosure is not limited to these descriptions, and it is obvious to those skilled in the art that various modifications and improvements can be made.

For example, the present disclosure can be applied to exemplary embodiments in which changes, replacements, additions, omissions, and the like of the configurations described in the exemplary embodiment and the modifications thereof are made. Additionally, each component described in the exemplary embodiment and the modifications thereof may be combined to make a new exemplary embodiment.

Although shaft stopper 72 extending in one direction is exemplified in the exemplary embodiment described above and the modifications of the exemplary embodiment, the shaft stopper may have a bent shape or a curved shape. Various shapes may be also applied to shaft stopper 72.

The fixing part and the fixed part also may have various shapes.

In addition, specifications, such as shape, size, and layout, of the rotary motor, the conversion mechanism, and other details can be changed as appropriate.

As described above, the hair clipper and the motor block used in the hair clipper according to the present disclosure can be reduced in noise during use, so that the motor block can be applied to treatment of not only hair but also various body hairs of human and animals, for example.

What is claimed is:

1. A hair clipper comprising:
- a rotary motor that includes a rotary shaft extending in a first direction and a motor drive unit that rotationally drives the rotary shaft;
- a conversion mechanism that is connected to the rotary shaft and converts rotational motion of the rotary shaft into reciprocating linear motion;
- a movable blade that is connected to the conversion mechanism and performs reciprocating linear motion;
- a fixed blade with which the movable blade is in sliding contact;
- a bearing that is provided in the motor drive unit to support the rotary shaft with a clearance provided between the bearing and a peripheral surface of the rotary shaft;
- at least one shaft stopper that presses the rotary shaft in at least one direction in directions intersecting the first direction to restrict shaft shaking during rotation of the rotary shaft caused by the clearance while allowing rotation of the rotary shaft; and
- a support part that supports the shaft stopper, wherein
- the at least one shaft stopper is a beam extending in a direction intersecting the first direction.

2. The hair clipper according to claim 1, wherein
- the support part is integrated with the motor drive unit, and
- the motor drive unit, the support part, and the at least one shaft stopper constitute at least a part of a motor block.

3. The hair clipper according to claim 2, wherein
- the peripheral surface is in contact with the bearing in a state where the support part and the motor drive unit are integrated.

4. The hair clipper according to claim 2, wherein
- the at least one shaft stopper includes a pair of shaft stoppers, and
- the rotary shaft is held by the pair of shaft stoppers in a state where the support part and the motor drive unit are integrated.

5. A motor block used in the hair clipper according to claim 2.

6. The hair clipper according to claim 1, wherein
- the beam has a double-supported beam structure.

7. The hair clipper according to claim 1, wherein
- the beam has a cantilever beam structure.

8. The hair clipper according to claim 1, wherein
- the beam extends in a direction that is orthogonal to a direction in which the movable blade performs reciprocating linear motion.

9. The hair clipper according to claim 1, wherein
- the at least one shaft stopper includes a surface which is provided with a recess, the surface being in sliding contact with the peripheral surface.

10. The hair clipper according to claim 1, wherein the support part comprises an attachment part attached to the motor drive unit.

11. The hair clipper according to claim 10, wherein
- the motor drive unit further comprises a motor body,
- the bearing is formed so as to protrude from the motor body in the first direction, and
- the attachment part comprises an annular part provided with an insertion hole into which the bearing is inserted.

12. The hair clipper according to claim 10, wherein
- the motor drive unit further comprises a motor body,
- the bearing is formed so as to protrude from the motor body in the first direction, and
- the attachment part comprises a C-shaped part attached to the bearing in a state where a pair of distal ends thereof are separated in the circumferential direction thereof.

13. The hair clipper according to claim 1, wherein
- the support part includes a fixing part fixed to a fixed part formed in the motor drive unit.

14. The hair clipper according to claim 1, further comprising:
- a housing provided with a motor holder that holds the rotary motor,
- wherein
- the support part is formed in the housing.

* * * * *